United States Patent
Yun

(10) Patent No.: US 11,013,071 B2
(45) Date of Patent: May 18, 2021

(54) COOKING APPARATUS

(71) Applicant: Samsung Electronics Co., Ltd., Suwon-si (KR)

(72) Inventor: Chang Sun Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 304 days.

(21) Appl. No.: 15/835,876

(22) Filed: Dec. 8, 2017

(65) Prior Publication Data

US 2018/0168005 A1    Jun. 14, 2018

(30) Foreign Application Priority Data

Dec. 8, 2016    (KR) .................. 10-2016-0167124

(51) Int. Cl.
     *H05B 6/12*      (2006.01)
     *H05B 6/06*      (2006.01)

(52) U.S. Cl.
CPC ........... *H05B 6/1272* (2013.01); *H05B 6/062* (2013.01); *H05B 6/065* (2013.01); *H05B 2206/02* (2013.01); *H05B 2213/03* (2013.01); *H05B 2213/05* (2013.01); *H05B 2213/07* (2013.01)

(58) Field of Classification Search
CPC ...... H05B 6/1272; H05B 6/062; H05B 6/056; H05B 2206/02; H05B 2213/03; H05B 2213/05; H05B 2213/07
See application file for complete search history.

(56) References Cited

U.S. PATENT DOCUMENTS

| 4,013,859 | A | * | 3/1977 | Peters, Jr. | .............. H05B 6/062 |
| | | | | | 219/626 |
| 4,426,564 | A | * | 1/1984 | Steigerwald | ...... H02M 7/53803 |
| | | | | | 219/624 |
| 6,018,154 | A | * | 1/2000 | Izaki | ..................... H02M 7/537 |
| | | | | | 219/625 |
| 2002/0117497 | A1 | * | 8/2002 | Bassill | .................. H05B 6/062 |
| | | | | | 219/626 |

(Continued)

FOREIGN PATENT DOCUMENTS

| EP | 2 034 800 A1 | 3/2009 |
| EP | 2914061 | 9/2015 |

(Continued)

OTHER PUBLICATIONS

International Search Report dated May 18, 2018 in International Patent Application No. PCT/KR2017/014228.

(Continued)

*Primary Examiner* — J C Jacyna
(74) *Attorney, Agent, or Firm* — Staas & Halsey LLP

(57) ABSTRACT

Disclosed herein is a cooking apparatus including a cooking plate, induction heating coils installed under the cooking plate, a vessel sensor configured to detect a cooking vessel while the cooking vessel is placed on the cooking plate, a driving assembly including a driving circuit configured to generate a driving current and distribute the driving current to each of the induction heating coils, and a sub assembly including a vessel sensing circuit configured to determine one or more of the induction heating coils overlapping the cooking vessel based on an output of the vessel sensor. The sub assembly may be separated from the driving assembly.

17 Claims, 21 Drawing Sheets

(56) References Cited

U.S. PATENT DOCUMENTS

| | | | | |
|---|---|---|---|---|
| 2009/0314771 A1* | 12/2009 | Okada | .................... | H05B 6/062 |
| | | | | 219/647 |
| 2011/0226756 A1 | 9/2011 | Arnal Valero et al. | | |
| 2012/0248095 A1* | 10/2012 | Lee | ...................... | H05B 6/1263 |
| | | | | 219/620 |
| 2012/0305545 A1* | 12/2012 | Brosnan | ............... | H05B 6/1272 |
| | | | | 219/622 |
| 2016/0021708 A1 | 1/2016 | Teramoto et al. | | |
| 2016/0150597 A1* | 5/2016 | Yun | ...................... | H05B 6/1272 |
| | | | | 219/624 |
| 2016/0381738 A1* | 12/2016 | Moon | .................. | H05B 6/1263 |
| | | | | 219/621 |
| 2020/0323048 A1* | 10/2020 | Kang | .................... | H05B 6/1263 |

FOREIGN PATENT DOCUMENTS

| | | |
|---|---|---|
| EP | 3013121 | 4/2016 |
| EP | 3 026 982 A1 | 6/2016 |
| JP | 2008-159494 | 7/2008 |
| JP | 2012-48891 | 3/2012 |
| KR | 10-2009-0057495 | 6/2009 |
| KR | 10-2012-0109263 | 10/2012 |
| KR | 10-2013-0107090 | 10/2013 |
| WO | WO 2013/042288 A1 | 3/2013 |
| WO | WO 2014/033580 A1 | 3/2014 |

OTHER PUBLICATIONS

Extended European Search Report dated Oct. 17, 2019 in corresponding European Patent Application No. 17879146.3.

* cited by examiner

COOKING APPARATUS

CROSS-REFERENCE TO RELATED APPLICATION(S)

This application claims the benefit of Korean Patent Application No. 10-2016-0167124, filed on Dec. 8, 2016 in the Korean Intellectual Property Office, the disclosure of which is incorporated herein by reference.

BACKGROUND

1. Field

Embodiments of the present disclosure relate to a cooking apparatus, and more particularly, to a cooking apparatus including a plurality of induction coils.

2. Description of the Related Art

In general, an induction heating cooking apparatus is an apparatus used to heat food using the principle of induction heating. An induction heating cooking apparatus includes a top plate on which a cooking vessel is placed and an inducting heating coil to generate a magnetic field when a current is supplied thereto.

When a current is supplied to the induction heating coil, a magnetic field is generated inducing a secondary current in the cooking vessel so that Joule heat is generated by resistance components of the cooking vessel. As the cooking vessel is heated by the Joule heat, food contained in the cooking vessel is heated.

Such an induction heating cooking apparatus heats the cooking vessel more quickly, does not generate harmful gases, and reduce the risk of fire compared to a gas range, a cooking stove using kerosene, or the like which heats the cooking vessels by combustion heat obtained by burning fossil fuels such as gas and oil.

Furthermore, in recent years, induction heating cooking apparatuses that automatically heat a cooking vessel placed at any position thereon have been developed. Such an induction heating cooking apparatus includes a large number of induction heating coils.

In the case where the induction heating cooking apparatus includes a large number of induction heating coils, it is difficult to arrange driving circuits to supply currents to the induction heating coils and control circuits to control the driving circuits. Also, it is difficult to arrange printed board assemblies (PBAs) in which the driving circuits and control circuits are installed.

SUMMARY

Therefore, it is an aspect of the present disclosure to provide a cooking apparatus in which printed board assemblies (PBA) including driving circuits and control circuits are easily assembled.

It is another aspect of the present disclosure to provide a cooking apparatus in which driving circuits and control circuits are installed in a plurality of PBAs.

It is another aspect of the present disclosure to provide a cooking apparatus in which a plurality of PBAs are arranged in a manner to minimize wires connecting the plurality of PBAs.

Additional aspects of the disclosure will be set forth in part in the description which follows and, in part, will be obvious from the description, or may be learned by practice of the disclosure.

In accordance with one aspect of the present disclosure, a cooking apparatus may include a cooking plate, induction heating coils installed under the cooking plate, a vessel sensor configured to detect a cooking vessel while the cooking vessel is placed on the cooking plate, a driving assembly including a driving circuit configured to generate a driving current and distribute the driving current to each of the induction heating coils, and a sub assembly including a vessel sensing circuit configured to determine one or more induction heating coils overlapping the cooking vessel based on an output of the vessel sensor. The sub assembly may be separated from the driving assembly.

The cooking apparatus may further include second induction heating coils installed under the cooking plate, and a second driving assembly separated from the first driving assembly and including a second driving circuit configured to generate a second driving current and distribute the second driving current to each of the second induction heating coils.

The sub assembly may be disposed between the first driving assembly and the second driving assembly.

The first driving assembly may further include a first power circuit configured to supply power to the first driving circuit from an external power source. The second driving assembly may further include a second power circuit configured to supply power to the second driving circuit from the external power source.

The cooking apparatus may further include a first power assembly including a first power circuit configured to supply power to the first driving circuit from an external power source, and a second power assembly including a second power circuit configured to supply power to the second driving circuit from the external power source.

The sub assembly, the first driving assembly and the second driving assembly may be disposed between the first power assembly and the second power assembly.

The cooking apparatus may further include a main assembly including a main processor configured to control the first driving circuit to supply the first driving current to the induction heating coils overlapping the cooking vessel based on an output of the vessel sensing circuit.

The cooking apparatus may further include a temperature sensor configured to measure a temperature of the cooking vessel placed on the cooking plate, and a temperature sensing circuit configured to transmit an output of the temperature sensor to the main processor.

The temperature sensing circuit may be installed in the sub assembly.

The temperature sensing circuit may be installed in the first driving assembly.

The temperature sensor and the vessel sensor may be installed in the vicinity of each of the induction heating coils, respectively.

The first driving circuit may include an inverter circuit comprising an inverter switch configured to generate the first driving current and a resonance capacitor configured to resonate with the first induction heating coils, a driving processor configured to control the inverter switch, and a distribution circuit comprising a distribution switch configured to distribute the first driving current generated by the inverter circuit to the first induction heating coils.

The driving processor may open or close the distribution switch to supply the first driving current to induction heating coils overlapping the cooking vessel.

The driving circuit may further include a current sensing circuit configured to measure the first driving current.

The driving processor may determine an opening/closing cycle of the inverter switch based on an output of the current sensing circuit and may open or close the inverter switch in accordance with the opening/closing cycle of the inverter switch.

In accordance with one aspect of the present disclosure, a cooking apparatus may include a cooking plate, induction heating coils installed under the cooking plate, a driving assembly including a switch opened or closed to generate a driving current supplied to the induction heating coils, a distribution assembly comprising a resonance capacitor configured to resonate with the induction heating coils and a distribution circuit configured to distribute the driving current to the induction heating coils, and a sub assembly including a sensing circuit configured to determine one or more induction heating coils overlapping a cooking vessel. The first driving assembly, the distribution assembly and the sub assembly may be separated.

The cooking apparatus may further include second induction heating coils installed under the cooking plate, a second driving assembly including a second switch opened or closed to generate a second driving current supplied to the second induction heating coils, and a second distribution assembly comprising a second resonance capacitor configured to resonate with the second induction heating coils and a second distribution circuit configured to distribute the second driving current to the second induction heating coils. The second driving assembly and the second distribution assembly may be separated from each other.

The sub assembly may be disposed between the first distribution assembly and the second distribution assembly.

The sub assembly, the first distribution assembly, and the second distribution assembly may be disposed between the first driving assembly and the second driving assembly.

The cooking apparatus may further include a first power assembly including a first power circuit configured to supply power to a first driving circuit from an external power source, and a second power assembly including a second power circuit configured to supply power to a second driving circuit from the external power source. The sub assembly, the first distribution assembly, the second distribution assembly, the first driving assembly, and the second driving assembly may be disposed between the first power assembly and the second power assembly.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
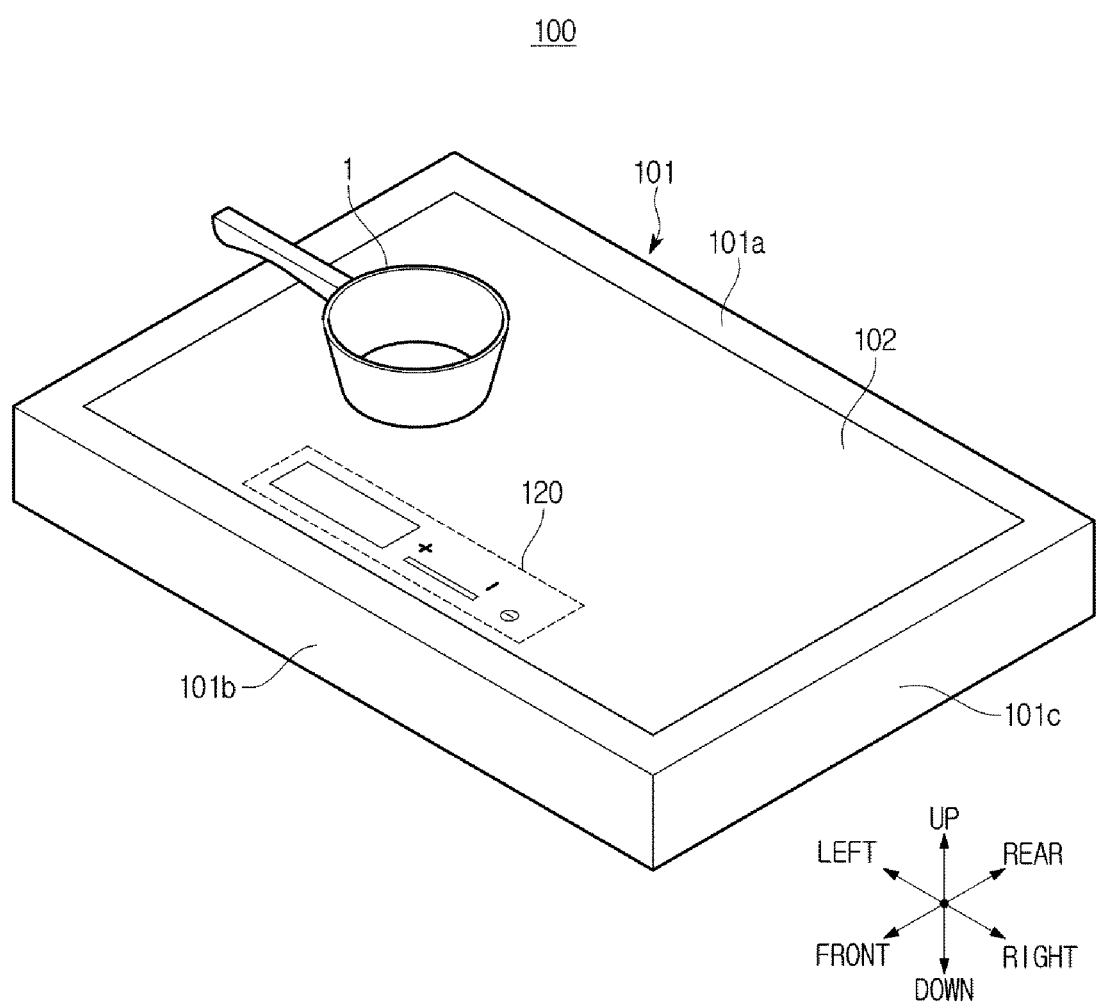
FIG. 1 is an external view of a cooking apparatus according to an embodiment.

Reference will now be made in detail to the embodiments of the present disclosure, examples of which are illustrated in the accompanying drawings, wherein like reference numerals refer to like elements throughout.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, operating principles and embodiments of the present disclosure will be described with reference to the accompanying drawings.

Figure 2:
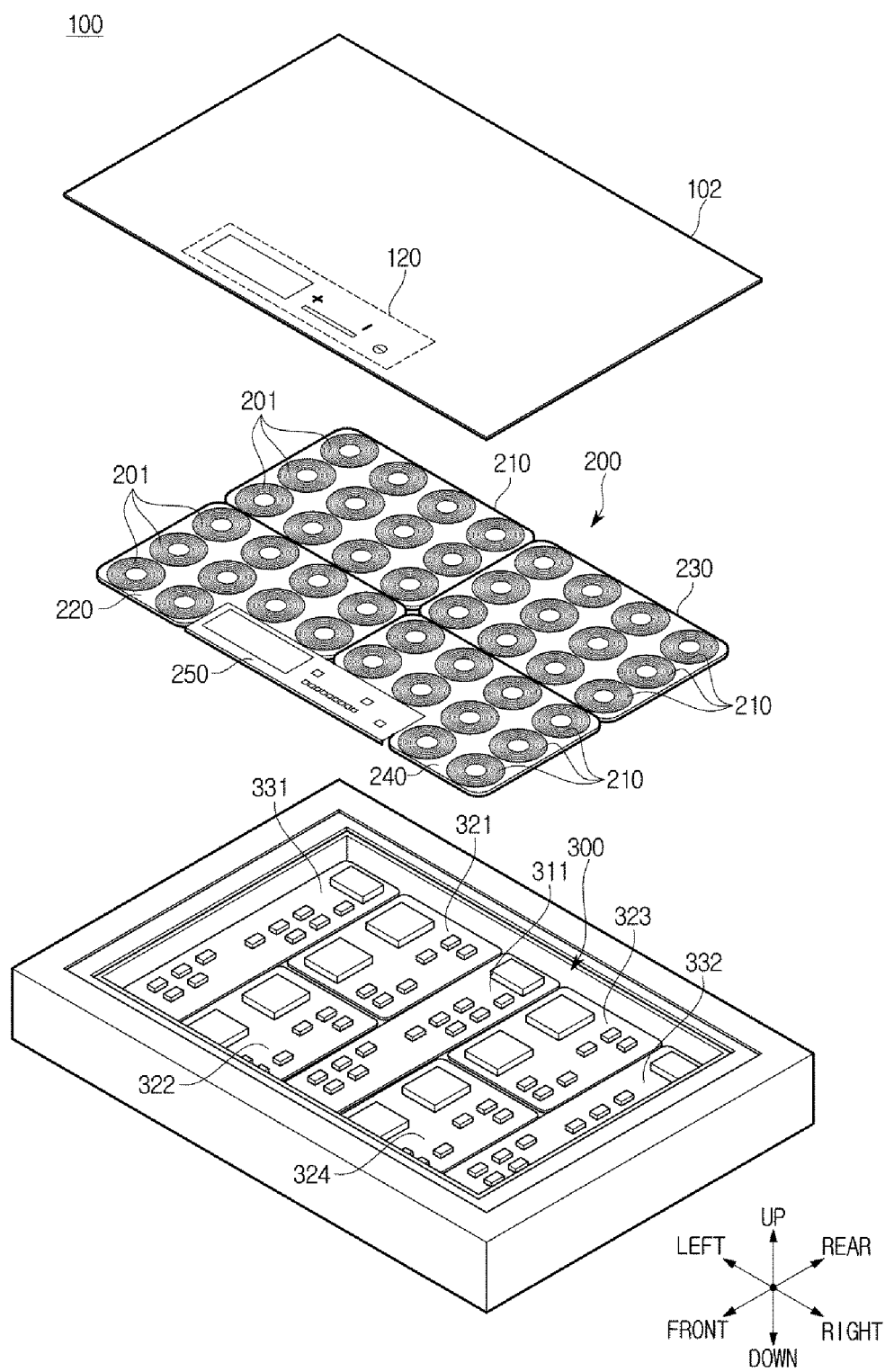
FIG. 2 is a view illustrating the inside of the cooking apparatus.
Figure 3:
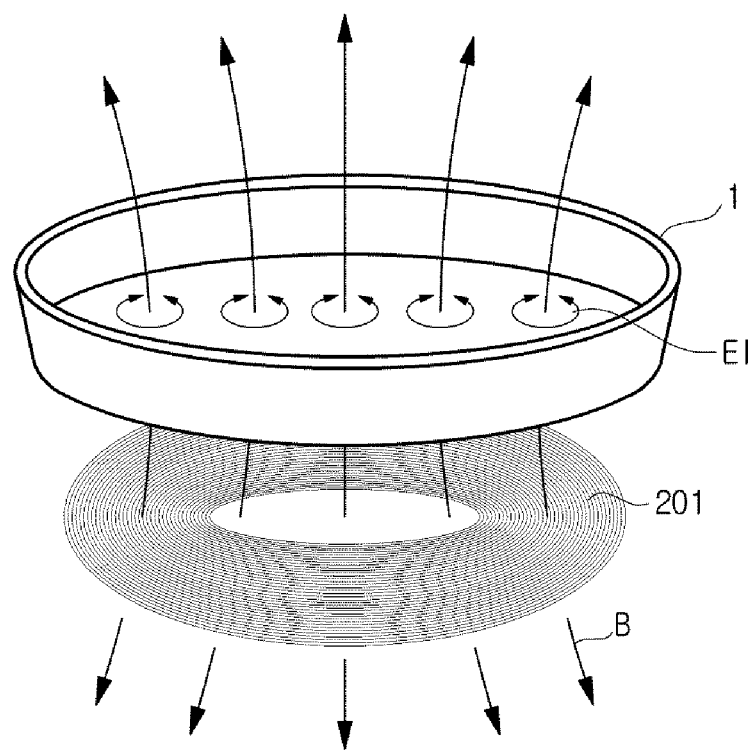
FIG. 3 is a view for describing a method of heating a cooking vessel by the cooking apparatus.

FIG. 1 is an external view of a cooking apparatus according to an embodiment. FIG. 2 is a view illustrating the inside of the cooking apparatus. FIG. 3 is a view for describing a method of heating a cooking vessel by the cooking apparatus.

Referring to FIGS. 1, 2, and 3, the cooking apparatus 100 may include a main body 101 defining an appearance of the cooking apparatus 100 and provided with various parts constituting the cooking apparatus 100.

A cooking plate 102 having a flat plate shape may be provided on a top surface 101a of the main body 101 to allow the cooking vessel 1 is placed thereon. The cooking plate 102 may be formed of tempered glass such as ceramic glass not to be easily broken.

The user interface 120 may be provided at one portion of the cooking plate 102 to receive a control command from a user and display operation information of the cooking apparatus 100 to the user. However, a position of the user interface 120 is not limited to the cooking plate 102, and the user interface 120 may also be located at various other positions such as a front surface 101b and/or side surfaces 101c of the main body 101.

As illustrated in FIG. 2, a heating layer 200 including a plurality of induction heating coils 201 configured to heat the cooking vessel 1 and a main assembly 250 configured to implement the user interface 120 may be disposed under the cooking plate 102.

Each of the plurality of induction heating coils 201 may generates a magnetic field and/or and an electromagnetic field to heat the cooking vessel 1.

When a driving current is supplied to the induction heating coil 201, a magnetic field B may be induced around the induction heating coil 201 as illustrated in FIG. 3. Particularly, when a current whose magnitude and direction change with time, i.e., an alternating current (AC), is supplied to the induction heating coil 201, a magnetic field B whose magnitude and direction change with time may be induced around the induction heating coil 201.

The magnetic field B generated around the induction heating coil 201 may pass through the cooking plate 102 formed of tempered glass and arrive at the cooking vessel 1 placed on the cooking plate 102.

An eddy current EI rotating around the magnetic field B may be generated in the cooking vessel 1 by the magnetic field B whose magnitude and direction change with time. As described above, a phenomenon in which the eddy current is generated by the changing magnetic field B with time is referred to as electromagnetic induction phenomenon. Electrical resistance heat may be generated in the cooking vessel 1 by the eddy current EI. Electrical resistance heat is heat generated in a resistor when currents flow therethrough and is also referred to as Joule heat. By this electrical resistance heat, the cooking vessel 1 is heated and food contained in the cooking vessel 1 may be heated.

As described above, each of the plurality of induction heating coils 201 may heat the cooking vessel 1 by the electromagnetic induction phenomenon and electrical resistance heat.

The plurality of induction heating coils 201 may be arranged in a predetermined pattern under the cooking plate 102. For example, as illustrated in FIG. 2, the plurality of induction heating coils 201 may be arranged in a matrix form with aligned rows and columns. In other words, the plurality of induction heating coils 201 may be arranged at regular intervals from the front to the rear of the main body 101 and at regular intervals from the left to the right of the main body 101.

The plurality of induction heating coils 201 may be divided into a plurality of groups 210, 220, 230, and 240. For example, the plurality of induction heating coils 201 may be divided into a first group 210, a second group 220, a third group 230, and a fourth group 240 as illustrated in FIG. 2.

The arrangement of the plurality of induction heating coils 201 is not limited to that shown in FIG. 2 and the plurality of induction heating coils 201 may be arranged in various forms. For example, the plurality of induction heating coils 201 may be arranged in a honeycomb shape to minimize intervals between the induction heating coils 201.

The main assembly 250 that implements the user interface 120 may be disposed under the user interface 120 provided at one portion of the cooking plate 102. The main assembly 250 may be a printed board assembly (PBA) including a display, a switch device, an integrated circuit device, and the like used to implement the user interface 120 and a printed circuit board (PCB) mounted therewith.

A position of the main assembly 250 is not limited to that shown in FIG. 2, and the main assembly 250 may be located at any position. For example, in the case where the user interface 120 is installed on the front surface 101b of the main body 101, the main assembly 250 may be disposed behind the front surface 101b of the main body 101 separately from the heating layer 200.

A driving layer 300 including a plurality of PBAs 311, 321, 322, 323, 324, 331, and 332 implementing circuits to supply driving currents to the plurality of induction heating coils 201 may be disposed under the heating layer 200.

The driving layer 300 may be partitioned into the plurality of PBAs 311, 321, 322, 323, 324, 331, and 332 as illustrated in FIG. 2, and each of the plurality of PBAs 311, 321, 322, 323, 324, 331, and 332 may include a switch device, an integrated circuit device, and the like to supply a driving current and a PCB mounted therewith.

For example, the plurality of PBAs 311, 321, 322, 323, 324, 331, and 332 may include a sub assembly 311 provided with sensing circuits configured to sense the presence of the cooking vessel 1 and a temperature of the cooking vessel 1, and driving assemblies 321, 322, 323, and 324 provided with driving circuits configured to supply driving currents to the plurality of induction heating coils 201, and power assemblies 331 and 332 provided with power circuits configured to supply power to the driving circuits.

Since the sensing circuits, the driving circuits, and the power circuits are mounted on different PBAs respectively as described above, assembling performance may be improved during a process of manufacturing the cooking apparatus 100. In other words, PBAs may be more easily manufactured by installing the sensing circuits, the driving circuits, and the power circuits respectively in the sub assembly 311, the driving assemblies 321, 322, 323, and 324, and the power assemblies 331 and 332 in comparison with the case where the sensing circuits, the driving circuits, and the power circuits are installed in a single PBA. In addition, it is easy to assemble several small-sized PBAs into the main body compared with the case of assembling one large-sized PBA into the main body.

Since the sensing circuits, the driving circuits, and the power circuits are installed on separate PBAs respectively, the cooking apparatus 100 may be easily maintained and repaired. In other words, when any one of the PBAs is defective, the detective PBA may be selectively replaced.

By installing the sensing circuits, the driving circuits, and the power circuits on separate PBAs, interference between circuits may be reduced. For example, since the sensing circuits are spatially separated from the power circuits that supply AC power, noise from the power circuits to the sensing circuits may be considerably reduced.

Since the cooking apparatus 100 include a number of induction heating coils 201 (44 induction heating coils according to FIG. 2), it may not be efficient to supply driving currents to all induction heating coils 201 by using one driving circuit.

Therefore, the cooking apparatus 100 may include a plurality of driving circuits, and the plurality of driving circuits may be installed in the plurality of driving assemblies (PBAs) 321, 322, 323, and 324. For example, four driving circuits may be installed in each of four driving assemblies 321, 322, 323, and 324, respectively.

The number of the induction heating coils 201 (44 induction heating coils according to FIG. 2) is greater than that of the driving assemblies 321, 322, 323, and 324 (4 driving assemblies according to FIG. 2). In order to supply driving currents to the 44 induction heating coils 210 by using four driving assemblies 321, 322, 323, and 324, the 44 induction heating coils 201 may be divided into four groups 210, 220, 230, and 240.

The four driving assemblies 321, 322, 323, and 324 may supply driving currents to the induction heating coils 201 respectively belonging to the four groups 210, 220, 230, and 240. For example, the first driving assembly 321 may supply driving currents to the induction heating coils 201 belonging to the first group 210, and the second driving assembly 322 may supply driving currents to the induction heating coils 201 belonging to the second group 220. Also, the third driving assembly 323 may supply driving currents to the induction heating coils 201 belonging to the third group 230, and the fourth driving assembly 324 may supply driving currents to the induction heating coils 201 belonging to the fourth group 240.

The number of the driving assemblies and the number of the groups are not limited to those shown in FIG. 2 and may vary according to the number of induction heating coils, a size of the cooking apparatus 100, sizes of devices constituting the driving circuits, magnitudes of driving currents respectively supplied to the induction heating coils, and magnitudes of currents output respectively from the driving assemblies. For example, when the size of the cooking apparatus 100 decreases and the number of the induction heating coils decreases, the driving circuits may be installed in two driving assemblies, respectively. In addition, when the size of the cooking apparatus 100 increases and the number of the induction heating coils increases, the driving circuits may be installed in 6 or 8 driving assemblies, respectively.

The four driving assemblies 321, 322, 323, and 324 may be disposed on both sides of the sub assembly 311, two on each side. For example, the first driving assembly 321 and the second driving assembly 322 may be disposed on the left side of the sub assembly 311 and the third driving assembly 323 and the fourth driving assembly 324 may be disposed on the right side of the sub assembly 311.

By disposing the four driving assemblies 321, 322, 323, and 324 on both sides of the sub assembly 311, two on each side, the power circuits may be installed in two power assemblies 331 and 332. In other words, in order to supply AC power to the driving assemblies 321 and 322 and to the driving assemblies 323 and 324 respectively disposed on both sides of the sub assembly 311, two power assemblies 331 and 332 may be disposed on one side of the driving assemblies 321 and 322 and one side of the driving assemblies 323 and 324. For example, the first power assembly 331 may be disposed on one side of the first and second driving assemblies 321 and 333 and the second power assembly 332 may be disposed on one side of the third and fourth driving assemblies 323 and 324.

As described above, the cooking apparatus 100 may include a plurality of induction heating coils 201 to heat the cooking vessel 1 and sensing circuits, driving circuits, and power circuits to supply driving currents to the induction heating coils 201. In addition, the sensing circuits, the driving circuit, and the power circuit may be installed in the plurality of PBAs 311, 321, 322, 323, 324, 331, and 332. Since the sensing circuits, the driving circuits, and the power circuits are installed in the plurality of PBAs 311, 321, 322, 323, 324, 331, and 332, the PBAs 311, 321, 322, 323, 324, 331, and 332 may be easily manufactured and assembled, resulting in improving productivity of the cooking apparatus 100.

The structure and functions of the cooking apparatus 100 have briefly been described above. Hereinafter, constituent elements of the cooking apparatus 100 and functions of the constituent elements will be described in detail.

Figure 4:
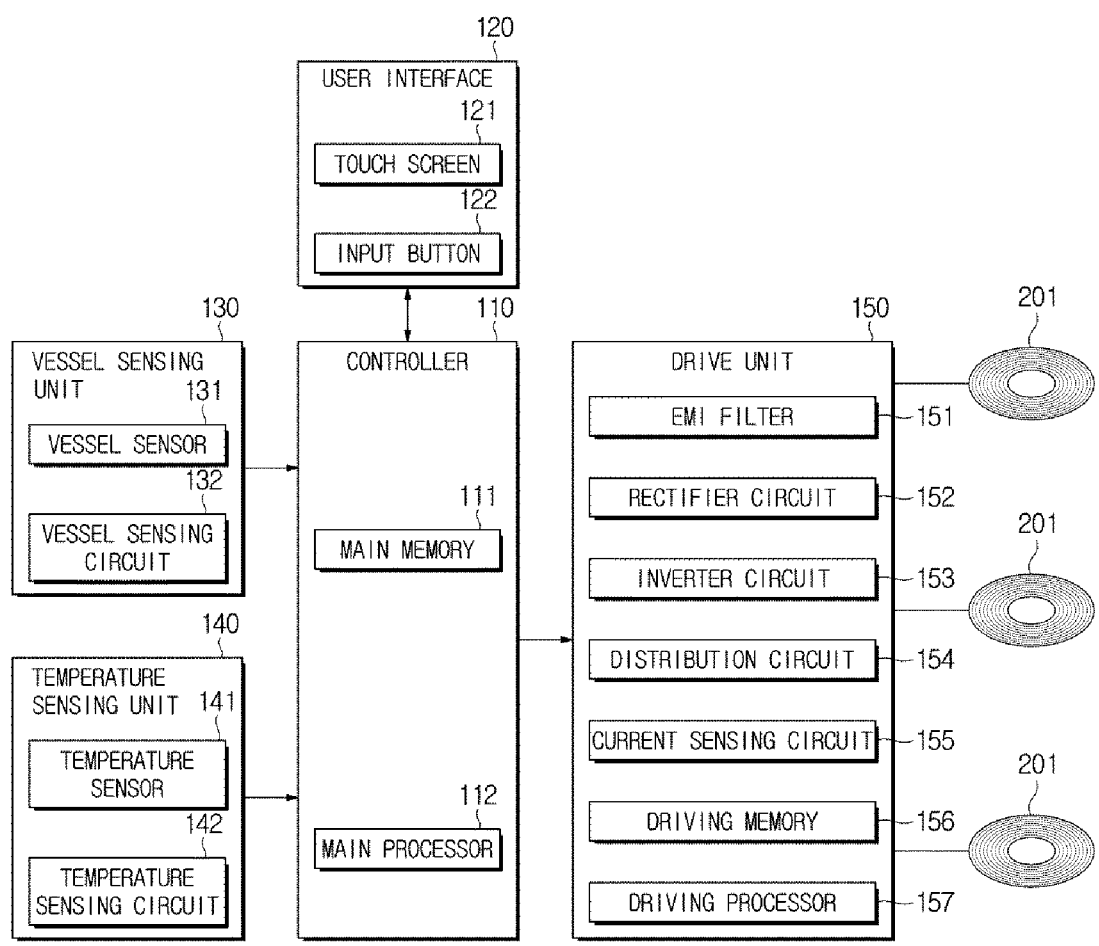
FIG. 4 is a diagram illustrating the configuration of a cooking apparatus according to an embodiment.
Figure 5:
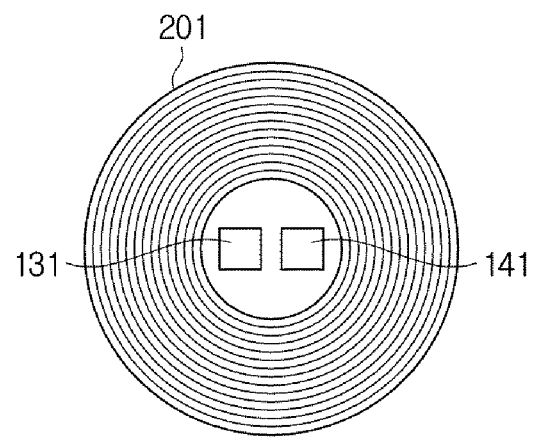
FIG. 5 is a diagram illustrating an induction heating coil, a vessel sensor, and a temperature sensor included in the cooking apparatus.
Figure 6:
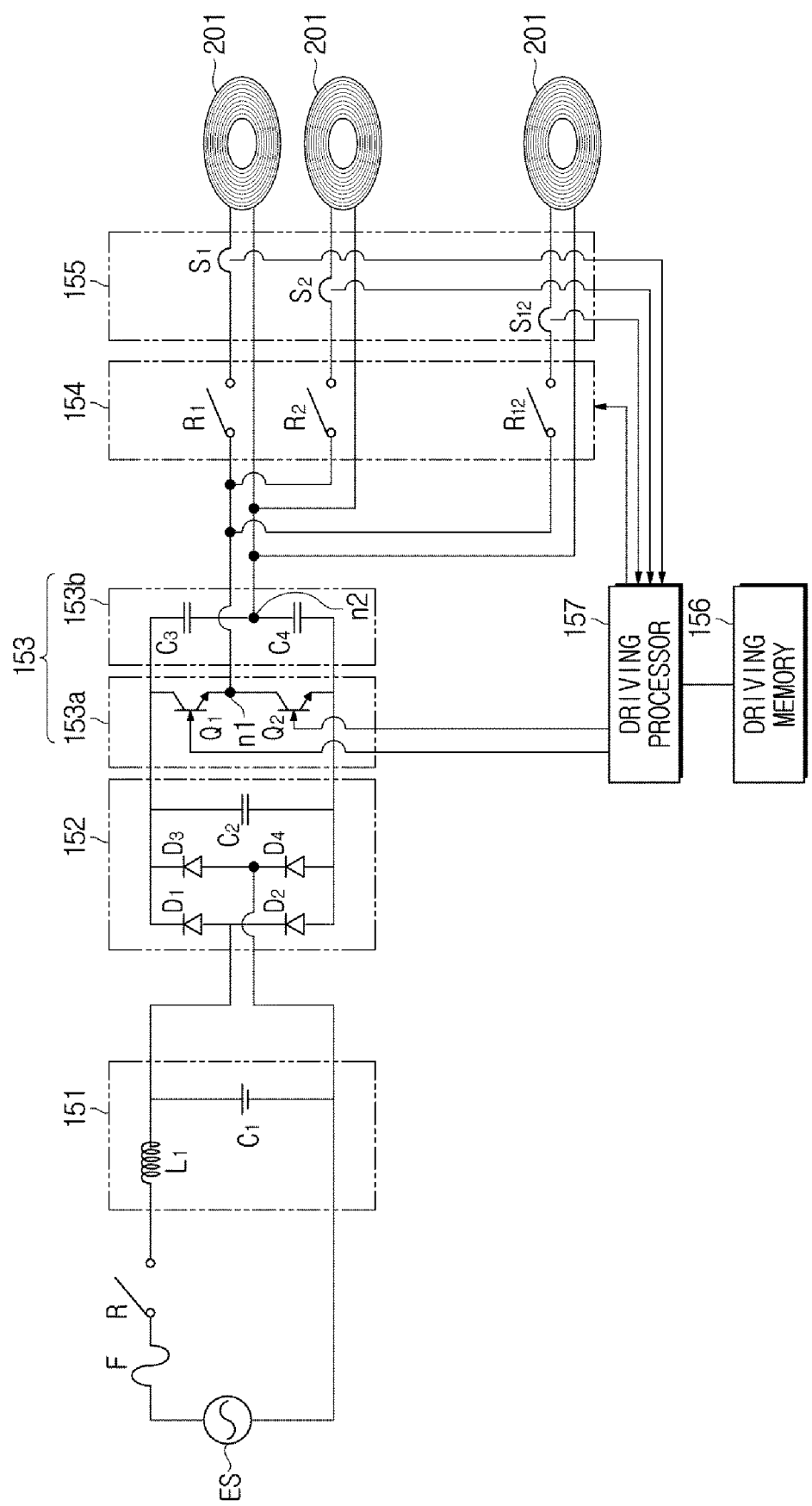
FIG. 6 is a circuit diagram of a drive unit included in the cooking apparatus.

FIG. 4 is a diagram illustrating the configuration of a cooking apparatus according to an embodiment. FIG. 5 is a diagram illustrating an induction heating coil, a vessel sensor, and a temperature sensor included in the cooking apparatus. FIG. 6 is a circuit diagram of a drive unit included in the cooking apparatus.

Referring to FIGS. 4, 5, and 6, the cooking apparatus 100 includes a plurality of induction heating coils 201, a user interface 120, a vessel sensing unit 130, a temperature sensing unit 140, a drive unit 150, and a controller 110.

The plurality of induction heating coils 201 may generate magnetic fields and/or electromagnetic fields to heat the cooking vessel 1 as described above.

The user interface 120 may include a touch screen 121 configured to receive a touch input from a user and display an image related to the operation of the cooking apparatus 100 in response to the touch input of the user and a input button 122 configured to receive a control command from the user.

The touch screen 121 may include a touch panel configured to receive the touch input from the user, a display panel configured to display an image related to the operation of the cooking apparatus 100, and a touch screen controller configured to control the operation of the touch panel and the display panel.

The touch screen 121 may display an image related to the operation of the cooking apparatus 100 and output a touch input of the user with respect to the displayed image to the controller 110. Also, the touch screen 121 may receive information on the operation of the cooking apparatus 100 from the controller 110 and output an image corresponding to the received information.

The input button 122 may include a plurality of buttons configured to receive a predetermined control command from the user and outputting an electrical signal corresponding to the control command of the user to the controller 110. For example, the input button 122 may include an operation button to receive power On/Off commands to turn on/off the cooking apparatus 100, a power up button and a power down button to receive intensities of the magnetic field and/or the electromagnetic field output from the cooking apparatus 100.

The input button 122 may be implemented using various types of buttons (or switches) such as a push button, a slide button, a toggle button, a touch button, and a dial.

As described above, the user interface 120 may receive a control command from the user and an electrical signal corresponding to the control command of the user to the controller 110. In addition, the user interface 120 may receive information on the operation of the cooking apparatus 100 from the controller 110 and display an image corresponding to the information on the operation of the cooking apparatus 100.

For example, the user interface 120 may display an image indicating a position of the cooking vessel 1 sensed by the vessel sensing unit 130 on the touch screen 121. In addition, the user interface 120 may receive a touch input to select the cooking vessel 1 via the touch screen 121 and output the touch input of the user to the controller 110. When the user inputs a command to increase power output of the cooking apparatus 100 via the input button 122, the user interface 120 may output a power up command to the controller 110.

The vessel sensing unit 130 may sense the position of the cooking vessel 1 placed on the cooking plate 102. The cooking vessel 1 may be located at any position on the cooking plate 102. Thus, the cooking apparatus 100 may sense the position of the cooking vessel 1 on the cooking plate 102 and selectively operate the induction heating coils 201 corresponding to the position of the cooking vessel 1 for efficient operation.

The vessel sensing unit 130 may include a plurality of vessel sensors 131 configured to sense the position of the cooking vessel 1 and a vessel sensing circuit 132 configured to process outputs of the vessel sensors 131 and output information on the position of the cooking vessel 1 to the controller 110.

The plurality of vessel sensors 131 may respectively be installed in the vicinity of the plurality of induction heating coils 201 and detect the cooking vessel 1 overlapping the induction heating coils 201. For example, the vessel sensor 131 may be located at the center of the induction heating coil 201 as illustrated in FIG. 5 and detect the cooking vessel 1 overlapping the center of the induction heating coil 201.

However, the position of the vessel sensor 131 is not limited to that illustrated in FIG. 5 and the vessel sensor 131 may also be installed at any position in the vicinity of the induction heating coil 201.

The vessel sensor 131 may include a capacitance sensor to detect the cooking vessel 1. Specifically, the vessel sensor 131 may sense a change in capacitance caused by the cooking vessel 1. However, the vessel sensor 131 is not limited to the capacitance sensor but may include various other sensors capable of detecting the cooking vessel 1 placed on the cooking plate 102 such as an infrared sensor, a weight sensor, a micro switch, and a membrane switch.

The vessel sensor 131 may output information on detection of the cooking vessel 1 to the vessel sensing circuit 132.

The vessel sensing circuit 132 may receive detection results of the cooking vessel 1 from the plurality of vessel sensors 131 and determine the position of the cooking vessel 1, particularly, induction heating coils 201 overlapping the cooking vessel 1, based on the detection results.

The vessel sensing circuit 132 may include a multiplexer to sequentially receive detection results from the plurality of vessel sensors 131 (44 vessel sensors according to FIG. 2) and a microprocessor to process the detection results of the plurality of vessel sensors 131.

The vessel sensing circuit 132 may output vessel position data obtained by processing the detection results of the plurality of vessel sensors 131 to the controller 110.

As described above, the vessel sensing unit 130 may determine induction heating coils 201 overlapping the cooking vessel 1 and output sensing results to the controller 110. The controller 110 may display the position of the cooking vessel 1 on the user interface 120 based on the sensing results of the vessel sensing unit 130.

The temperature sensing unit 140 may sense a temperature of the cooking vessel 1 placed on the cooking plate 102. The cooking vessel 1 is heated by the induction heating coils 201 and may be overheated depending on a material thereof. Thus, for safe operation, the cooking apparatus 100 may sense a temperature of the cooking vessel 1 placed on the cooking plate 102 and stop the operation of the induction heating coils 201 when the cooking vessel 1 is overheated.

The temperature sensing unit 140 may include a plurality of temperature sensors 141 configured to sense the temperature of the cooking vessel 1 and a temperature sensing circuit 142 configured to process outputs of the temperature sensors 141 and output information on the temperature of the cooking vessel 1 to the controller 110.

The plurality of temperature sensors 141 may respectively be installed in the vicinity of to the plurality of induction heating coils 201 and measure the temperature of the cooking vessel 1 heated by the induction heating coils 201. For example, the temperature sensor 141 may be located at the center of the induction heating coil 201 as illustrated in FIG. 5 and directly measure a temperature of the cooking vessel 1 and a temperature of the cooking plate 102 to estimate a temperature of the cooking vessel 1. However, the position of the temperature sensor 141 is not limited to that illustrated in FIG. 5 and may be installed at any position in the vicinity of the induction heating coil 201.

The temperature sensor 141 may include a thermistor whose electrical resistance varies according to temperature.

The temperature sensor 141 may output a signal indicating the temperature of the cooking vessel 1 (a signal indicating the temperature of the cooking vessel or a signal indicating the temperature of the cooking plate) to the temperature sensing circuit 142.

The temperature sensing circuit 142 may receive signals indicating the temperatures of the cooking vessel 1 from the plurality of temperature sensors 141 and determine the temperature of the cooking vessel 1 based on the received signals.

The temperature sensing circuit 142 may include a multiplexer configured to sequentially receive signals indicating temperatures from the plurality of temperature sensors 141 (44 temperature sensors according to FIG. 2) and an analog-digital converter (ADC) configured to convert the signals indicating temperatures into digital temperature data.

The temperature sensing circuit 142 may process the signals indicating temperatures of the cooking vessel 1 output from the plurality of temperature sensors 141 and output temperature data to the controller 110.

As described above, the temperature sensing unit 140 may sense the temperature of the cooking vessel 1 and output the sensing result to the controller 110. The controller 110 may determine whether or not the cooking vessel 1 is overheated based on the sensing result of the temperature sensing unit 140 and stop heating of the cooking vessel 1 upon determination that the cooking vessel 1 is overheated.

The drive unit 150 may receive power from an external power source and supply currents to the induction heating coils 201 in accordance with a driving control signal of the controller 110. As described above, the driving circuits may be installed respectively in the plurality of driving assemblies 321, 322, 323, and 324. To assist the understanding of the present disclosure, a driving circuit installed in any one of the plurality of driving assemblies 321, 322, 323, and 324 will be described.

The drive unit 150 may include an electromagnetic interference (EMI) filter 151, a rectifier circuit 152, an inverter circuit 153, a distribution circuit 154, a current sensing circuit 155, a driving memory 156, and a driving processor 157.

The EMI filter 151 may block high frequency noise (for example, harmonics of alternating current (AC) power) included in AC power that is supplied by the external power source ES and allow AC voltage and AC current of a predetermined frequency (e.g., 50 hertz (Hz) or 60 Hz) to flow.

The EMI filter 151 may include an inductor L1 disposed between an input and an output of the EMI filter 151 and a capacitor C1 provided between a positive output and a negative output of the EMI filter 151. The inductor L1 may block the high frequency noise and the capacitor C1 may bypass the high frequency noise to the external power source ES.

A fuse F and a relay R may further be provided between the EMI filter 151 and the external power source ES to block an overcurrent.

The AC power from which the high frequency noise is removed by the EMI filter 151 is supplied to the rectifier circuit 152.

The rectifier circuit 152 may convert the AC power into direct current (DC) power. Particularly, the rectifier circuit 152 may convert an AC voltage whose magnitude and polarity (positive voltage or negative voltage) changes with time into a DC voltage having a constant magnitude and polarity and an AC current whose magnitude and polarity (positive current or negative current) changes with time into a DC current having a constant magnitude and polarity.

The rectifier circuit 152 may include a bridge diode. Specifically, the rectifier circuit 152 may include four diodes D1, D2, D3, and D4. Among the diodes D1, D2, D3, and D4, two pairs of serially connected diodes may be connected to each other in parallel such that a pair of diodes D1 and D2 are connected to each other in series, a pair of diodes D3 and D4 are connected to each other in series, and the diode pair of D1 and D2 may be connected in parallel to the diode pair of D3 and D4. The bridge diode may convert an AC voltage whose polarity changes with time into a positive voltage having a constant voltage and convert an AC current whose direction changes with time into a positive current having a constant direction.

The rectifier circuit 152 may further include a DC link capacitor C2. The DC link capacitor C2 may convert a positive voltage whose magnitude changes with time into a DC voltage having a constant magnitude.

As described above, the rectifier circuit 152 may receive an AC voltage and an AC current from the EMI filter 151 and output a DC voltage and a DC current.

The inverter circuit 153 may include a switching circuit 153a configured to supply or block a driving current to the induction heating coil 201 and a resonance circuit 153b configured to produce resonance with the induction heating coil 201.

The switching circuit 153a includes a first switch Q1 and a second switch Q2, and the first switch Q1 and the second switch Q2 are connected in series between a plus line P and a minus line N.

The first switch Q1 and the second switch Q2 may be turned on or off according to a driving control signal of a driving processor 157. In addition, according to On/Off states of the first switch Q1 and the second switch Q2, currents may flow into the induction heating coil 201 via the first switch Q1 and/or the second switch Q2 or flow out of the induction heating coil 201 via the first switch Q1 and/or the second switch Q2.

Figure 7:
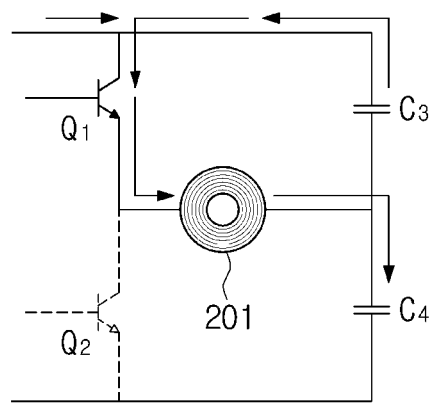
FIGS. 7 and 8 are an operation of an induction heating coil and a drive unit included in the cooking apparatus.
Figure 8:
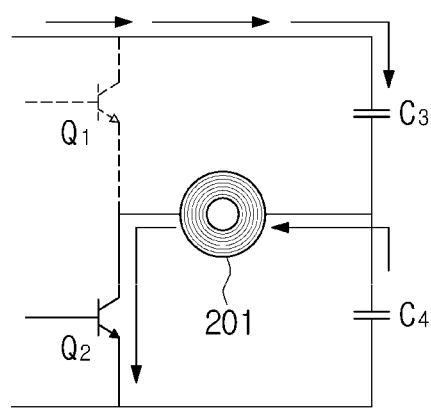

For example, when the first switch Q1 is closed (turned on) and the second switch Q2 is open (turned off) as illustrated in FIG. 7, a current may flow into the induction heating coil 201 via the first switch Q1. In addition, when the first switch Q1 is open (turned off) and the second switch Q2 is closed (turned on) as illustrated in FIG. 8, a current may flow out of the induction heating coil 201 via the second switch Q2.

Since the first switch Q1 and the second switch Q2 are turned on/off at a high speed of 20 kilohertz (kHz) to 70 kHz, the first switch Q1 and the second switch Q2 may include a three-terminal semiconductor switch having a quick response time. For example, the first switch Q1 and the second switch Q2 may include a bipolar junction transistor (BJT), a metal-oxide-semiconductor field effect transistor (MOSFET), an insulated gate bipolar transistor (IGBT), a thyristor, or the like.

The resonance circuit 153b includes a first resonance capacitor C3 and a second resonance capacitor C4 and the first resonance capacitor C3 and the second resonance capacitor C4 are connected in series between the plus line P and the minus line N.

A current may flow into the induction heating coil 201 from the first resonance capacitor C3 and/or the second resonance capacitor C4 and a current may flow out of the induction heating coil 201 via the first resonance capacitor C3 and/or the second resonance capacitor C4.

For example, when the first switch Q1 is closed (turned on) and the second switch Q2 is open (turned off) as illustrated in FIG. 7, a current may flow out of the induction heating coil 201 into the first resonance capacitor C3 and/or the second resonance capacitor C4. In addition, when the first switch Q1 is open (turned off) and the second switch Q2 is closed (turned on) as illustrated in FIG. 8, a current may flow into the induction heating coil 201 from the first resonance capacitor C3 and/or the second resonance capacitor C4.

As describe above, the inverter circuit 153 may control the current supplied to the induction heating coil 201. Specifically, according to On/Off states of the first switch Q1 and the second switch Q2 of the inverter circuit 153, a positive current or a negative current may be supplied to the induction heating coil 201.

For example, when the first switch Q1 is closed (turned on) and the second switch Q2 is open (turned off) as illustrated in FIG. 7, a current flowing from the rectifier circuit 152 may be supplied to the induction heating coil 201 via the first switch Q1. The current supplied to the induction heating coil 201 flows into the second resonance capacitor C4 via the induction heating coil 201 and thus electric energy is stored in the second resonance capacitor C4. In this case, a positive current may flow through the induction heating coil 201. Also, as electric energy is stored in the second resonance capacitor C4, a current may be supplied to the induction heating coil 201 via the first switch Q1 from the first resonance capacitor C3.

In addition, when the first switch Q1 is open (turned off) and the second switch Q2 is closed (turned on) as illustrated in FIG. 8, a current may be supplied from the second resonance capacitor C4 to the induction heating coil 201. The current supplied to the induction heating coil 201 may flow to the rectifier circuit 152 via the induction heating coil 201 and the second switch Q2. In this case, a negative current may flow through the induction heating coil 201. In addition, as the current is output from the second resonance capacitor C4, electric energy stored in the second resonance capacitor C4 is reduced. As electric energy of the second resonance capacitor C4 is reduced, a current may be supplied to the first resonance capacitor C3 from the rectifier circuit 152.

The distribution circuit 154 may include a plurality of switches R1, R2, . . . R12 allowing currents to flow or blocking the currents from flowing into the plurality of induction heating coils 201 and the plurality of switches R1, R2, . . . R12 may be turned on or off according to a distribution control signal of the driving processor 157.

As illustrated in FIG. 6, the induction heating coils 201 are connected to each other in parallel between a first node n1 between the first switch Q1 and the second switch Q2 and a second node n2 between the first resonance capacitor C3 and the second resonance capacitor C4. The plurality of switches R1, R2, . . . R12 of the distribution circuit 154 are respectively connected to the plurality of induction heating coils 201 in series to allow currents to flow or block the currents from flowing into the induction heating coils 201 from the inverter circuit 153.

The drive unit 150 of the cooking apparatus 100 may supply driving currents into the plurality of induction heating coils 201 belonging to the groups 210, 220, 230, and 240. For example, as illustrated in FIG. 2, the drive unit 150 may supply driving currents into 11 or 12 induction heating coils 201. In addition, the cooking apparatus 100 may detect a position of the cooking vessel 1, i.e., positions of induction heating coils 201 overlapping the cooking vessel 1. Thus, the cooking apparatus 100 may supply driving currents selectively to the induction heating coils 201 overlapping the cooking vessel 1 for the efficient operation thereof.

Specifically, when the cooking vessel 1 placed on the cooking plate 102 is detected, the cooking apparatus 100 may close (turn on) the switches R1, R2, . . . R12 connected to the induction heating coils 201 overlapping the cooking vessel 1, open (turn off) the switches R1, R2, . . . R12 connected to the other induction heating coils 201 not overlapping the cooking vessel 1, and control the inverter circuit 153 to supply driving currents to the plurality of induction heating coils 201.

Figure 11:
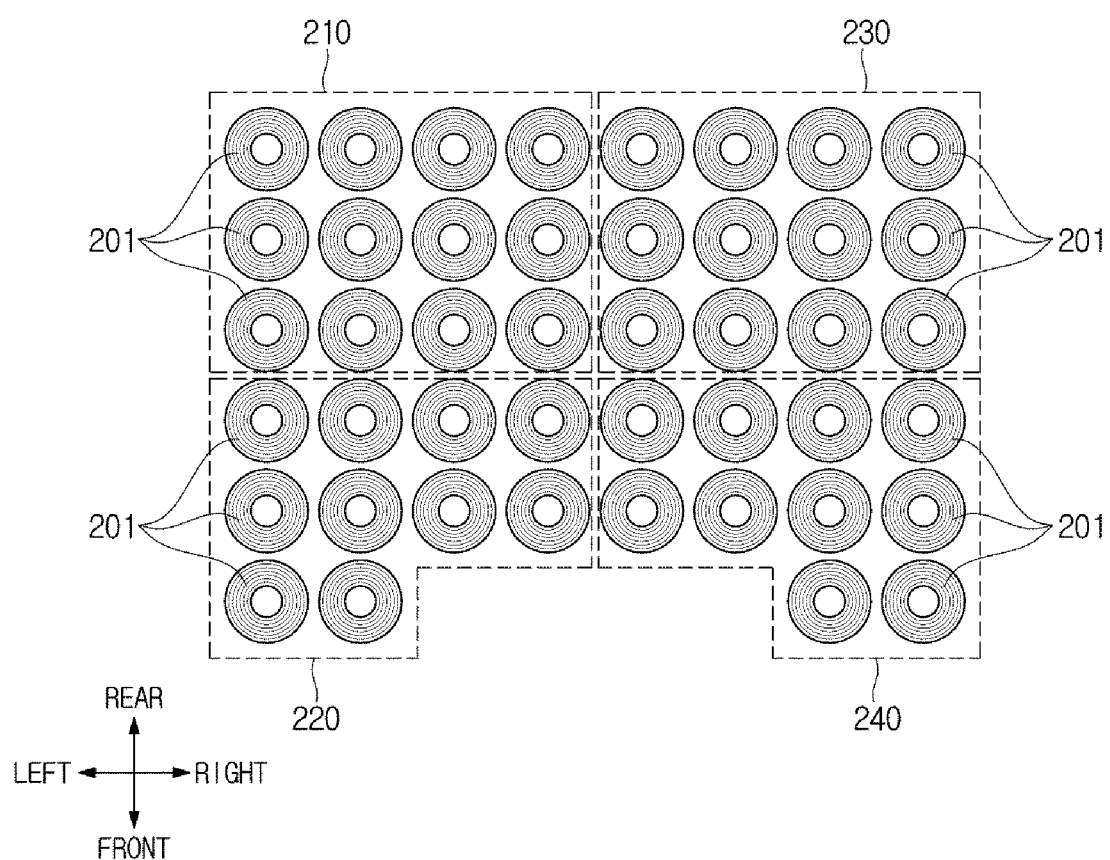
FIG. 11 is a view exemplarily illustrating arrangement of induction heating coils included in the cooking apparatus.
Figure 12:
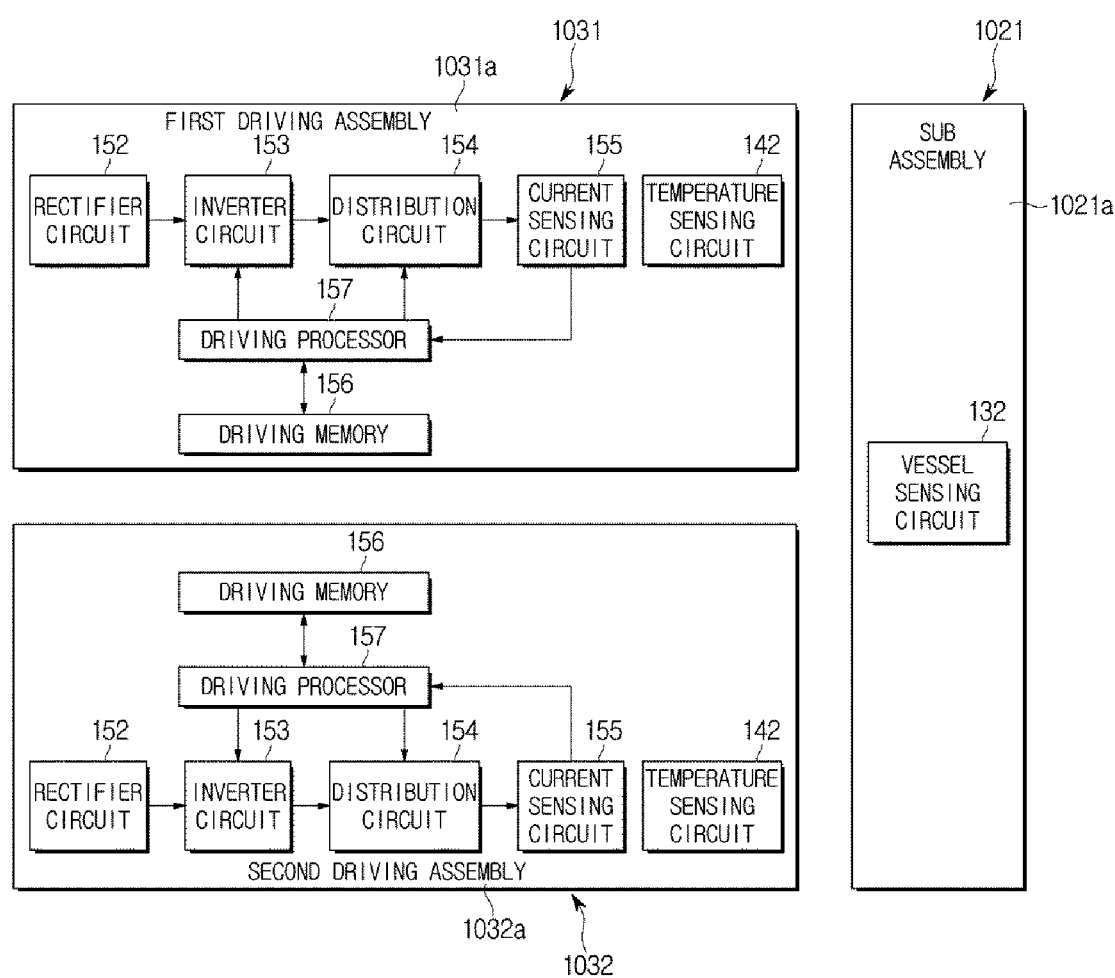
FIG. 12 illustrates another example of circuits included in the driving assemblies and the sub assembly illustrated in FIG. 9.

In addition, in the case where the drive unit 150 drives 11 or 12 induction heating coils 201 as illustrated in FIG. 2, 11 or 12 switches R1, R2, . . . R12 may be provided to control currents respectively supplied to the 11 or 12 induction heating coils 201.

Each of the switches R1, R2, . . . R12 included in the distribution circuit 154 may include a relay.

As described above, the distribution circuit 154 may block driving currents from flowing into the induction heating coils 201 not overlapping the cooking vessel 1 and allow the driving currents selectively to flow into the induction heating coils 201 overlapping the cooking vessel 1.

The current sensing circuit 155 may include current sensors S1, S2, . . . S12 configured to measure currents respectively supplied into the induction heating coils 201. The current sensors S1, S2, . . . S12 may output electrical signals corresponding to the measured current values to the driving processor 157.

In order to control an amount of heat generated by the cooking vessel 1, the user may control the output of the cooking apparatus 100 via the user interface 120. In this case, the amount of heat generated by the cooking vessel 1 is controlled in accordance with an intensity of the magnetic field B output from the induction heating coils 201 and the intensity of the magnetic field B output from the induction heating coils 201 may be controlled in accordance with the magnitude of the currents supplied to the induction heating coils 201. Thus, the cooking apparatus 100 may control the magnitude of the currents supplied to the induction heating coils 201 to control the amount of heat generated by the cooking vessel 1 and measure current values supplied to the induction heating coils 201 to control the magnitude of the current supplied to the induction heating coils 201.

The current sensors S1, S2, . . . S12 may measure current values of the induction heating coils 201 to control the magnitude of the currents supplied to the induction heating coils 201.

The current sensors S1, S2, . . . S12 may include various circuits. For example, the current sensors S1, S2, . . . S12 may include a hall sensor to measure the intensity of the magnetic field generated around a wire supplying a current to the induction heating coil 201 and calculate a current value supplied to the induction heating coil 201 based on the intensity of the magnetic field measured by the hall sensor.

As described above, the current sensing circuit 155 may measure the magnitude of the currents respectively supplied to the plurality of induction heating coils 201.

The driving memory 156 may store a driving program and driving data to control the operation of the drive unit 150. In addition, the driving memory 156 may temporarily store a control command received from the controller 110, a current value measured by the current sensing circuit 155, and the like.

In addition, the driving memory 156 may provide the driving program and/or driving data to the driving processor 157 or provide the control command received from the controller 110 and/or the current value measured by the current sensing circuit 155 to the driving processor 157 in accordance with a memory control signal of the driving processor 157.

The driving memory 156 may include a volatile memory temporarily storing data such as Static Random Access Memory (S-RAM) and Dynamic Random Access Memory (D-RAM). The driving memory 156 may also include a non-volatile memory storing the driving program and/or driving data for a long period of time such as Read Only Memory (ROM), Erasable Programmable Read Only Memory (EPROM), Electrically Erasable Programmable Read Only Memory (EEPROM), and flash memory.

The driving processor 157 may include various logic circuits and arithmetic circuits and may process data in accordance with a program provided by the driving memory 156 and generate a control signal in accordance with a processing result.

For example, the driving processor 157 may calculate a switching frequency (turn on/off frequency) of the switching circuit 153a of the inverter circuit 153 based on an output control signal indicating an intensity of an output of the cooking apparatus 100 and the current value received from the current sensing circuit 155 and may generate a driving control signal to turn on/off the switching circuit 153a in accordance with the calculated switching frequency. In addition, the driving processor 157 may generate a distribution control signal to turn on/off the plurality of switches R1, R2, . . . R12 of the distribution circuit 154 according to a position of the cooking vessel 1 received from the controller 110.

The driving memory 156 and the driving processor 157 may be implemented using separate integrated circuits (ICs). Alternatively, the driving memory 156 and the driving processor 157 may be integrated into a single integrated circuit (IC).

As described above, the drive unit 150 may selectively supply driving currents to the plurality of induction heating coils 201 in accordance with an intensity of an output of the controller 110.

The controller 110 may control the overall operation of the cooking apparatus 100 in accordance with a user input received via the user interface 120 and may include a main memory 111 and a main processor 112.

The main memory 111 may store a control program and control data to control the operation of the cooking apparatus 1. In addition, the main memory 111 may temporarily store the user input received from the user interface 120, position data of the cooking vessel 1 received from the vessel sensing unit 130, and temperature data of the cooking vessel 1 received from the temperature sensing unit 140.

In addition, the main memory 111 may provide the control program and/or control data to the main processor 112 or provide the user input, position data of the cooking vessel 1, and/or temperature data of the cooking vessel 1 to the main processor 112 in accordance with a memory control signal of the main processor 112.

The main memory 111 may include a volatile memory temporarily storing data such as S-RAM and D-RAM. The main memory 111 may also include a non-volatile memory storing the control program and/or control data for a long period of time such as ROM, EPROM, EEPROM, and flash memory.

The main processor 112 may include various logic circuits and arithmetic circuits and may process data in accordance with a program provided by the main memory 111 and generate a control signal in accordance with a processing result.

For example, the main processor 111 may generate an output control signal to control the intensity of the magnetic field B of the induction heating coil 201 in accordance with the intensity of the output received from the user interface 120. In addition, the main processor 111 may generate a signal to prevent overheating to block AC power from being supplied to the drive unit 150 in accordance with temperature of the cooking vessel 1. In addition, if required, the main memory 111 may generate a distribution control signal to turn on/off the plurality of switches R1, R2, . . . R12 of the distribution circuit 154 in accordance with the position of the cooking vessel 1.

The main memory 111 and the main processor 112 may be implemented using separate integrated circuits (ICs). Alternatively, the main memory 111 and the main processor 112 may be integrated into a single integrated circuit (IC).

As described above, the controller 110 may control the drive unit 150 to selectively supply driving currents to the plurality of induction heating coils 201 in accordance with the user input that is input via the user interface 120.

The constituent elements of the cooking apparatus 100 and functions of the constituent elements have been described above. Hereinafter, arrangement of printed board assemblies (PBAs) included in the cooking apparatus 100 will be described.

Figure 9:
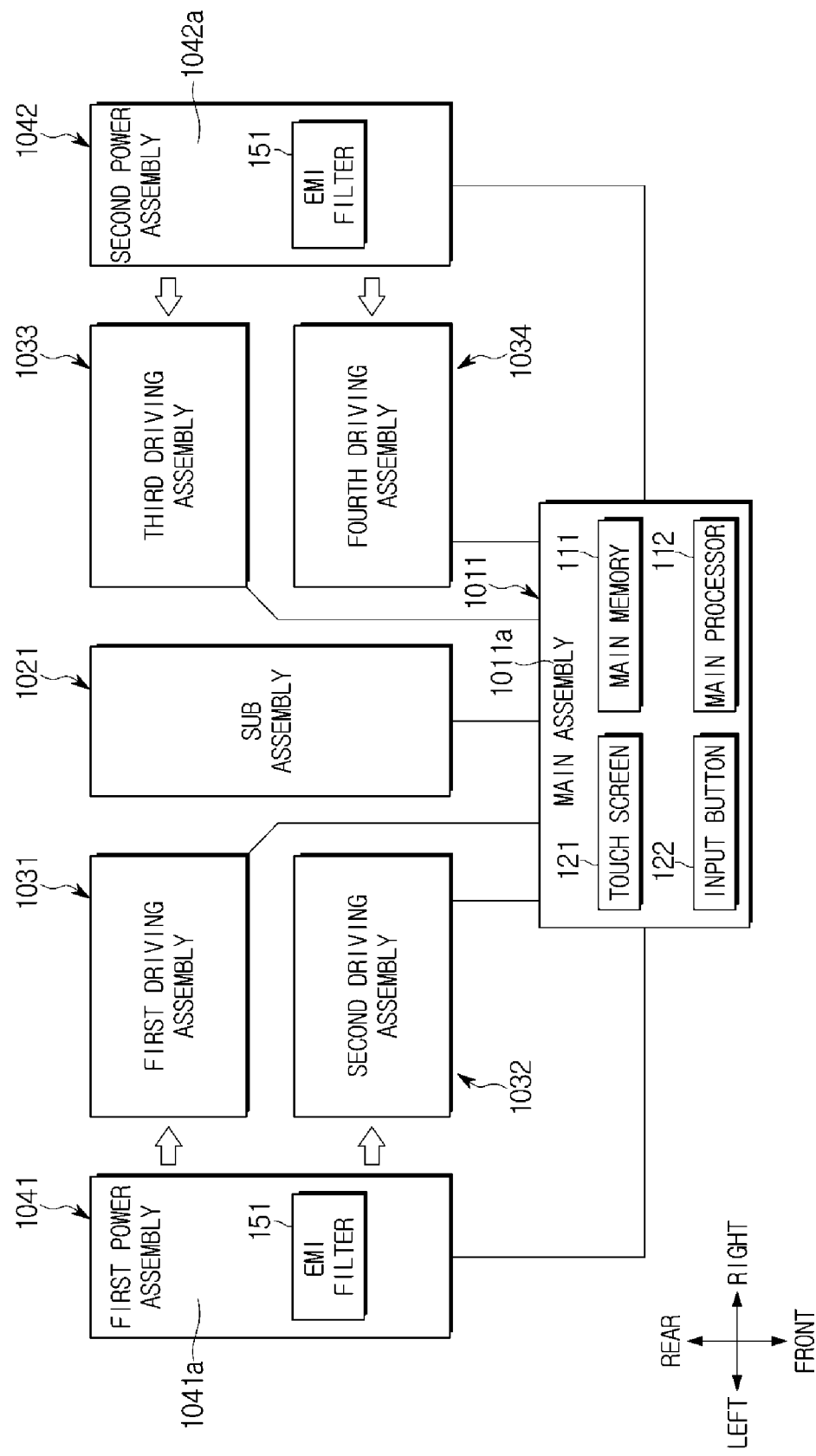
FIG. 9 is a view exemplarily illustrating arrangement of PBAs included in a cooking apparatus according to an embodiment.
Figure 10:
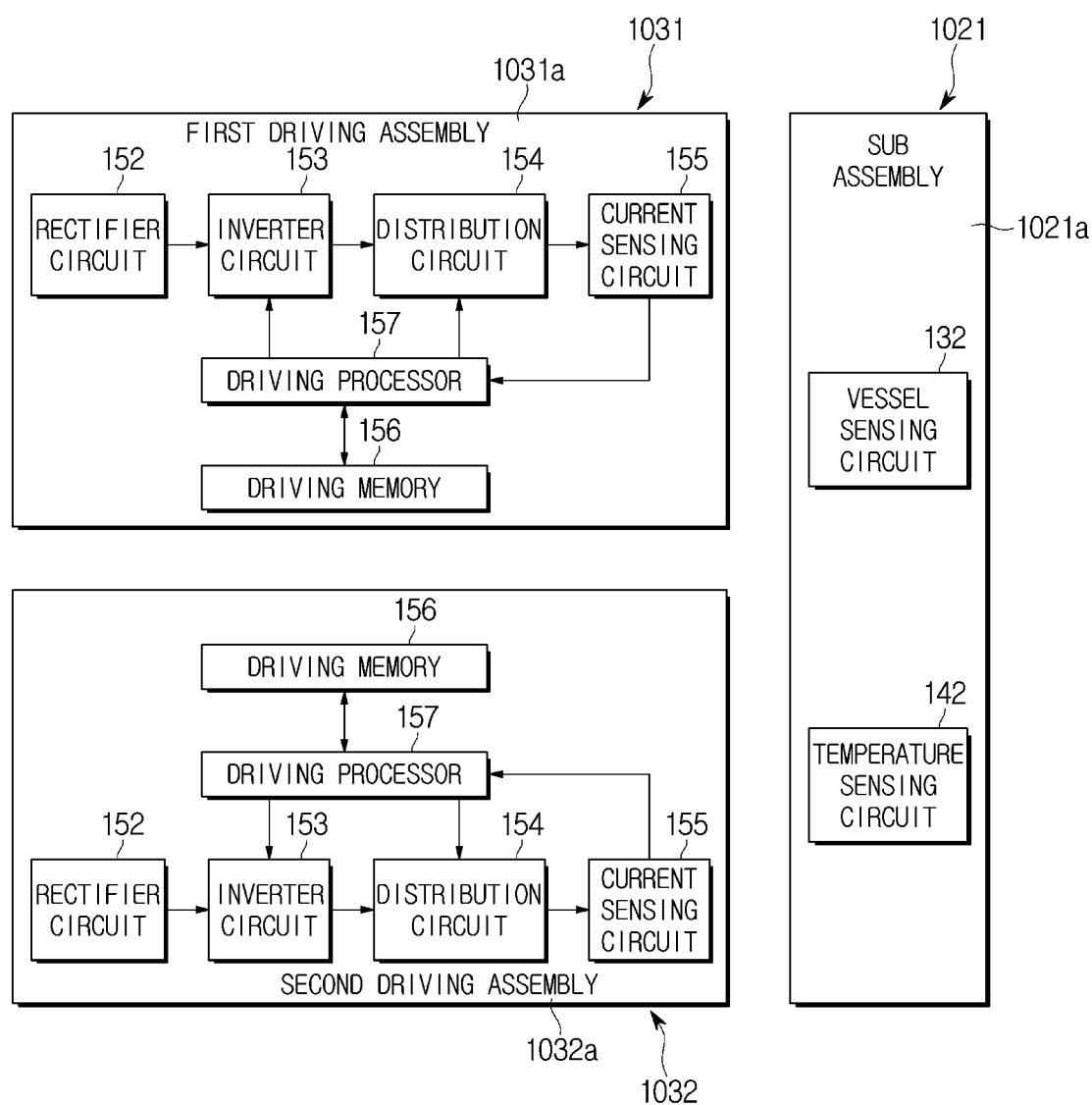
FIG. 10 is a view exemplarily illustrating circuits included in a driving assembly and a sub assembly illustrated in FIG. 9.

For example, FIG. 9 is a view exemplarily illustrating arrangement of PBAs included in a cooking apparatus according to an embodiment. FIG. 10 is a view exemplarily illustrating circuits included in a driving assembly and a sub assembly illustrated in FIG. 9. FIG. 11 is a view exemplarily illustrating arrangement of induction heating coils included in the cooking apparatus.

As shown in FIGS. 9, 10, and 11, the cooking apparatus 100 may include a main assembly 1011, a sub assembly 1021, a first driving assembly 1031, a second driving assembly 1032, a third driving assembly 1033, a fourth driving assembly 1034, a first power assembly 1041, and a second power assembly 1042.

As described above, the cooking apparatus 100 may include the user interface 120, the vessel sensing unit 130, the temperature sensing unit 140, the drive unit 150, and the controller 110. In this case, the user interface 120, the vessel sensing unit 130, the temperature sensing unit 140, the drive unit 150, and the controller 110 are defined by classifying a plurality of components and circuits (e.g., the touch screen, the input button, the main memory, the main processor, and the like) included in the cooking apparatus 100 according to functions and operations and grouping the components and circuits. In other words, the user interface 120, the vessel sensing unit 130, the temperature sensing unit 140, the drive unit 150, and the controller 110 may refer to components and circuits that perform similar or equivalent functions and do not refer to physically integrated components or a single PBA. Thus, components and circuits included in the same configurations 110, 120, 130, 140, and 150 may be installed in different PBAs 1011, 1021, 1031, 1032, 1033, 1034, 1041, and 1042 if required.

For example, the main assembly 1011 may include the touch screen 121, the input button 122, the main memory 111, and the main processor 112 which may be mounted on a main PCB 1011a. In other words, although the touch screen 121 and the input button 122 may be included in the user interface 120 and the main memory 111 and the main processor 112 may be included in the controller 110 functionally, the touch screen 121, the input button 122, the main memory 111, and the main processor 112 may constitute the main assembly 1011 physically.

In addition, the main assembly 1011 may include a connection terminal for connecting the main processor 112 with the vessel sensing circuit 132 and/or the temperature sensing circuit 142 of the sub assembly 1021 and a connection terminal for connecting the main processor 112 with the driving processors 157 of the first, second, third, and fourth driving assemblies 1031, 1032, 1033, and 1034.

The sub assembly 1021 may include the vessel sensing circuit 132 and the temperature sensing circuit 142. The vessel sensing circuit 132 and the temperature sensing circuit 142 may be mounted on a sub PCB 1021a. In other words, although the vessel sensing circuit 132 may be included in the vessel sensing unit 130 and the temperature sensing circuit 142 may be included in the temperature sensing unit 140 functionally, the vessel sensing circuit 132 and the temperature sensing circuit 142 may constitute the sub assembly 1021 physically, As described above, the plurality of vessel sensors 131 may be separately disposed from the vessel sensing circuit 132 and installed in the vicinity of the induction heating coils 201. The vessel sensing circuit 132 may be connected to all vessel sensors 131 and receive detection results of the cooking vessel from the vessel sensors 131.

In addition, the plurality of temperature sensors 141 may be separately disposed from the temperature sensing circuit 142 and installed in the vicinity of the induction heating coils 201. The temperature sensing circuit 142 may be connected to all temperature sensors 141 and receive temperatures of the cooking vessel from the temperature sensors 141.

The sub assembly 1021 may include a connection terminal for connecting the vessel sensing circuit 132 with the vessel sensors 131 in the vicinity of the induction heating coils 201, a connection terminal for connecting the temperature sensing circuit 142 with the temperature sensors 141 in the vicinity of the induction heating coils 201, and a connection terminal for connecting the vessel sensing circuit 132 and the temperature sensing circuit 142 with the main processor 112 of the main assembly 1011.

The first driving assembly 1031 may include the rectifier circuit 152, the inverter circuit 153, the distribution circuit 154, the current sensing circuit 155, the driving memory 156, and the driving processor 157 which may be mounted on a first driving PCB 1031a. In other words, although the rectifier circuit 152, the inverter circuit 153, the distribution circuit 154, the current sensing circuit 155, the driving memory 156, and the driving processor 157 may be included in the drive unit 150 functionally, the rectifier circuit 152, the inverter circuit 153, the distribution circuit 154, the current sensing circuit 155, the driving memory 156, and the driving processor 157 may constitute the first driving assembly 1031 physically. In addition, the EMI filter 151 included in the drive unit 150 may be separately installed in the power assemblies 1041 and 1042 which will be described below.

In addition, the first driving assembly 1032 may include a connection terminal for connecting the driving processor 157 with the main processor 112 of the main assembly 1011, a connection terminal for connecting the rectifier circuit 152 with the EMI filter 151 of the first power assembly 1041, and a connection terminal for connecting the distribution circuit 154 with the plurality of induction heating coils 201 belonging to the first group 210.

The second, third, and fourth driving assemblies 1032, 1033, and 1034 may have the same structure as that of the first driving assembly 1031. For example, the second driving assembly 1032 may include the rectifier circuit 152, the inverter circuit 153, the distribution circuit 154, the current sensing circuit 155, the driving memory 156, and the driving processor 157 which may be mounted on a second driving PCB 1032a.

The driving circuits respectively included in the first, second, third, and fourth driving assemblies 1031, 1032, 1033, and 1034 may supply driving currents to the plurality of induction heating coils 201. For example, the driving circuits respectively included in the four driving assemblies 1031, 1032, 1033, and 1034 may supply driving currents to the 44 induction heating coils 201. The 44 induction heating coils 201 may be classified into the four groups 210, 220, 230, and 240 receiving the driving currents respectively from the four driving assemblies 1031, 1032, 1033, and 1034. For example, as illustrated in FIG. 11, 44 induction heating coils 201 may be classified into the first group 210 that receives driving currents from the driving circuit of the first driving assembly 1031, the second group 220 that receives driving currents from the driving circuit of the second driving assembly 1032, the third group 230 that receives driving currents from the driving circuit of the third driving assembly 1033, and the fourth group 240 that receives driving currents from the driving circuit of the fourth driving assembly 1034.

The first power assembly 1041 may include the EMI filter 151 which may be mounted on a first power PCB 1051a. In other words, the EMI filter 151 may be included in the drive unit 150 functionally and may constitute the first power assembly 1041 physically. If required, a fuse F (FIG. 6) and a relay R (FIG. 6) may be provided in the first power assembly 1041.

In addition, the first power assembly 1041 may include a connection terminal for connecting the EMI filter 151 with the external power source and a connection terminal for connecting the EMI filter 151 with the rectifier circuits 152 of the first and second driving assemblies 1031 and 1032.

The structure of the second power assembly 1042 may be the same as that of the first power assembly 1041.

As described above, the components and circuits constituting the cooking apparatus 100 may be installed in the plurality of PBAs 1011, 1021, 1031, 1032, 1033, 1034, 1041, and 1042 according to functions, types of supplied power (AC power or DC power), operation frequencies, and the like.

In addition, the plurality of PBAs 1011, 1021, 1031, 1032, 1033, 1034, 1041, and 1042 may be arranged in various ways according to the components and circuits.

For example, the main assembly 1011 including the touch screen 121 and the input button 122 of the user interface 120 may be disposed inside the top surface 101a of the main body 101 or inside the front surface 101b of the main body 101 for interactions with the user.

The sub assembly 1021 including the vessel sensing circuit 132 and the temperature sensing circuit 142 respectively connected to the vessel sensors 131 and the temperature sensors 141 installed in the vicinity of the induction heating coils 201 may be disposed at the center the main body 101.

The first driving assembly 1031 may be mounted on the rear left side of the sub assembly 1021 to supply driving currents to the induction heating coils 201 belonging to the first group 210 located on the rear left portion of the main body 101. The second driving assembly 1032 may be mounted on the front left side of the sub assembly 1021 to supply driving currents to the induction heating coils 201 belonging to the second group 220 located on the front left portion of the main body 101. The third driving assembly 1033 may be mounted on the rear right side of the sub assembly 1021 to supply driving currents to the induction heating coils 201 belonging to the third group 230 located on the rear right portion of the main body 101. The fourth driving assembly 1034 may be mounted on the front right side of the sub assembly 1021 to supply driving currents to the induction heating coils 201 belonging to the fourth group 240 located on the front right portion of the main body 101.

The first power assembly 1041 may be mounted on the left side of the first and second driving assemblies 1031 and 1032, i.e., outside the first and second driving assemblies 1031 and 1032, to supply AC power to the first and second driving assemblies 1031 and 1032. Also, the second power assembly 1042 may be mounted on the right side of the third and fourth driving assemblies 1033 and 1034, i.e., outside the third and fourth driving assemblies 1033 and 1034 to supply AC power to the third and fourth driving assemblies 1033 and 1034.

By arranging the plurality of PBAs 1011, 1021, 1031, 1032, 1033, 1034, 1041, and 1042 as illustrated in FIG. 9, the lengths and numbers of wires used to connect the plurality of PBAs 1011, 1021, 1031, 1032, 1033, 1034, 1041, and 1042 may be minimized and intersections of the wires may also be minimized.

However, the circuits installed in the driving assemblies 1031, 1032, 1033, and 1034 and the sub assembly 1021 are not limited to those illustrated in FIG. 10.

For example, FIG. 12 illustrates another example of circuits included in the driving assemblies and the sub assembly illustrated in FIG. 9.

As illustrated in FIG. 12, the sub assembly 1021 may include the vessel sensing circuit 132 and the vessel sensing circuit 132 may be mounted on the sub PCB 1021a.

As described above, the plurality of vessel sensors 131 may be separately disposed from the vessel sensing circuit 132 and installed in the vicinity of the induction heating coils 201. The vessel sensing circuit 132 may be connected to all vessel sensors 131 and receive detection results of the cooking vessel from the vessel sensors 131.

In addition, the sub assembly 1021 may include a connection terminal for connecting the vessel sensing circuit 132 with the vessel sensors 131 in the vicinity of the induction heating coils 201 and a connection terminal for connecting the vessel sensing circuit 132 with the main processor 112 of the main assembly 1011.

The first driving assembly 1031 may include the rectifier circuit 152, the inverter circuit 153, the distribution circuit 154, the current sensing circuit 155, the driving memory 156, the driving processor 157, and the temperature sensing circuit 141 which may be mounted on the first PCB 1031a.

The driving circuits 152, 153, 154, 155, 156, and 157 included in the first driving assembly 1031 may supply the driving currents to the induction heating coils 201 belonging to the first group 210.

The plurality of temperature sensors 141 may be separately disposed from the temperature sensing circuit 142 and installed in the vicinity of the induction heating coils 201. The temperature sensing circuit 142 of the first driving assembly 1031 may be connected to the temperature sensors 141 installed in the vicinity of the induction heating coils 201 belonging to the first group 210 and receive temperatures of the cooking vessel from the temperature sensors 141.

The first driving assembly 1032 may include a connection terminal for connecting the driving processor 157 with the main processor 112 of the main assembly 1011, a connection terminal for connecting the rectifier circuit 152 with the EMI filter 151 of the first power assembly 1041, a connection terminal for connecting the distribution circuit 154 with the induction heating coils 201 belonging to the first group 210, a connection terminal for connecting the temperature sensing circuit 142 with the temperature sensors 141, and a connection terminal for connecting the temperature sensing circuit 142 with the main processor 112 of the main assembly 1011.

The second, third, and fourth driving assemblies 1032, 1033, and 1034 may have the same structure as that of the first driving assembly 1031.

Particularly, the temperature sensing circuit 142 included in the second driving assembly 1032 may receive temperature of the cooking vessel from the temperature sensors 141 installed in the vicinity of the induction heating coils 201 belonging to the second group 220, the temperature sensing circuit 142 included in the third driving assembly 1033 may receive temperatures of the cooking vessel from the temperature sensors 141 installed in the vicinity of the induction heating coils 201 belonging to the third group 230, and the temperature sensing circuit 142 included in the fourth driving assembly 1034 may receive temperatures of the cooking vessel from the temperature sensors 141 installed in the vicinity of the induction heating coils 201 belonging to the fourth group 240.

Figure 13:
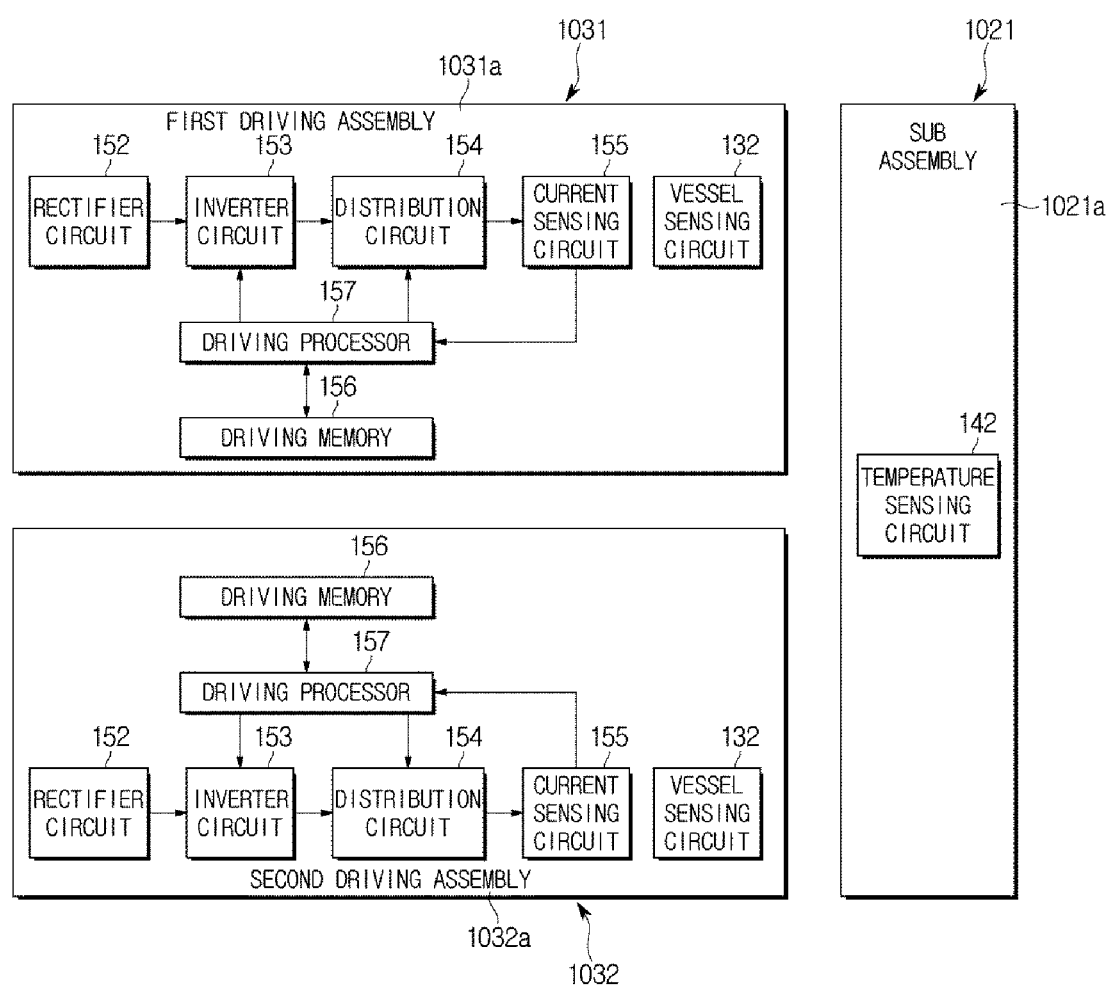
FIG. 13 illustrates another example of circuits included in the driving assemblies and the sub assembly illustrating in FIG. 9.

For example, FIG. 13 illustrates another example of circuits included in the driving assemblies and the sub assembly illustrating in FIG. 9.

As illustrated in FIG. 13, the sub assembly 1021 may include the temperature sensing circuit 142 and the temperature sensing circuit 142 may be mounted on the sub PCB 1021a.

As described above the plurality of temperature sensors 141 may be separately disposed from the temperature sensing circuit 142 and installed in the vicinity of the induction heating coils 201. The temperature sensing circuit 142 may be connected to all temperature sensors 141 and receive temperatures of the cooking vessel from the temperature sensors 141.

In addition, the sub assembly 1021 may include a connection terminal for connecting the temperature sensing circuit 142 with the temperature sensors 141 in the vicinity of the induction heating coils 201 and a connection terminal for connecting the temperature sensing circuit 142 with the main processor 112 of the main assembly 1011.

The first driving assembly 1031 may include the rectifier circuit 152, the inverter circuit 153, the distribution circuit 154, the current sensing circuit 155, the driving memory 156, the driving processor 157, and the vessel sensing circuit 131 which may be mounted on the first driving PCB 1031a.

The driving circuits 152, 153, 154, 155, 156, and 157 included in the first driving assembly 1031 may supply the driving currents to the induction heating coils 201 belonging to the first group 210.

The plurality of vessel sensors 131 may be separately disposed from the vessel sensing circuit 132 and installed in the vicinity of the induction heating coils 201. The vessel sensing circuit 132 of the first driving assembly 1031 may be connected to the vessel sensors 131 installed in the vicinity of the induction heating coils 201 belonging to the first group 210 and receive detection results of the cooking vessel from the vessel sensors 131.

The first driving assembly 1031 may include a connection terminal for connecting the driving processor 157 with the main processor 112 of the main assembly 1011, a connection terminal for connecting the rectifier circuit 152 with the EMI filter 151 of the first power assembly 1041, a connection terminal for connecting the distribution circuit 154 with the induction heating coils 201 belonging to the first group 210, a connection terminal for connecting the vessel sensing circuit 132 with the vessel sensors 131, and a connection terminal for connecting the vessel sensing circuit 132 with the main processor 112 of the main assembly 1011.

The second, third, and fourth driving assemblies 1032, 1033, and 1034 may have the same structure as that of the first driving assembly 1031.

Particularly, the vessel sensing circuit 132 included in the second driving assembly 1032 may receive detection results of the cooking vessel from the vessel sensors 131 installed in the vicinity of the induction heating coils 201 belonging to the second group 220, the vessel sensing circuit 132 included in the third driving assembly 1033 may receive detection results of the cooking vessel from the vessel sensors 131 installed in the vicinity of the induction heating coils 201 belonging to the third group 230, and the vessel sensing circuit 132 included in the fourth driving assembly 1034 may receive detection results of the cooking vessel from the vessel sensors 131 installed in the vicinity of the induction heating coils 201 belonging to the fourth group 240.

The configurations and arrangements of the plurality of PBAs included in the cooking apparatus 100 are not limited to those illustrated in FIGS. 9, 10, 11, 12, and 13.

Figure 14:
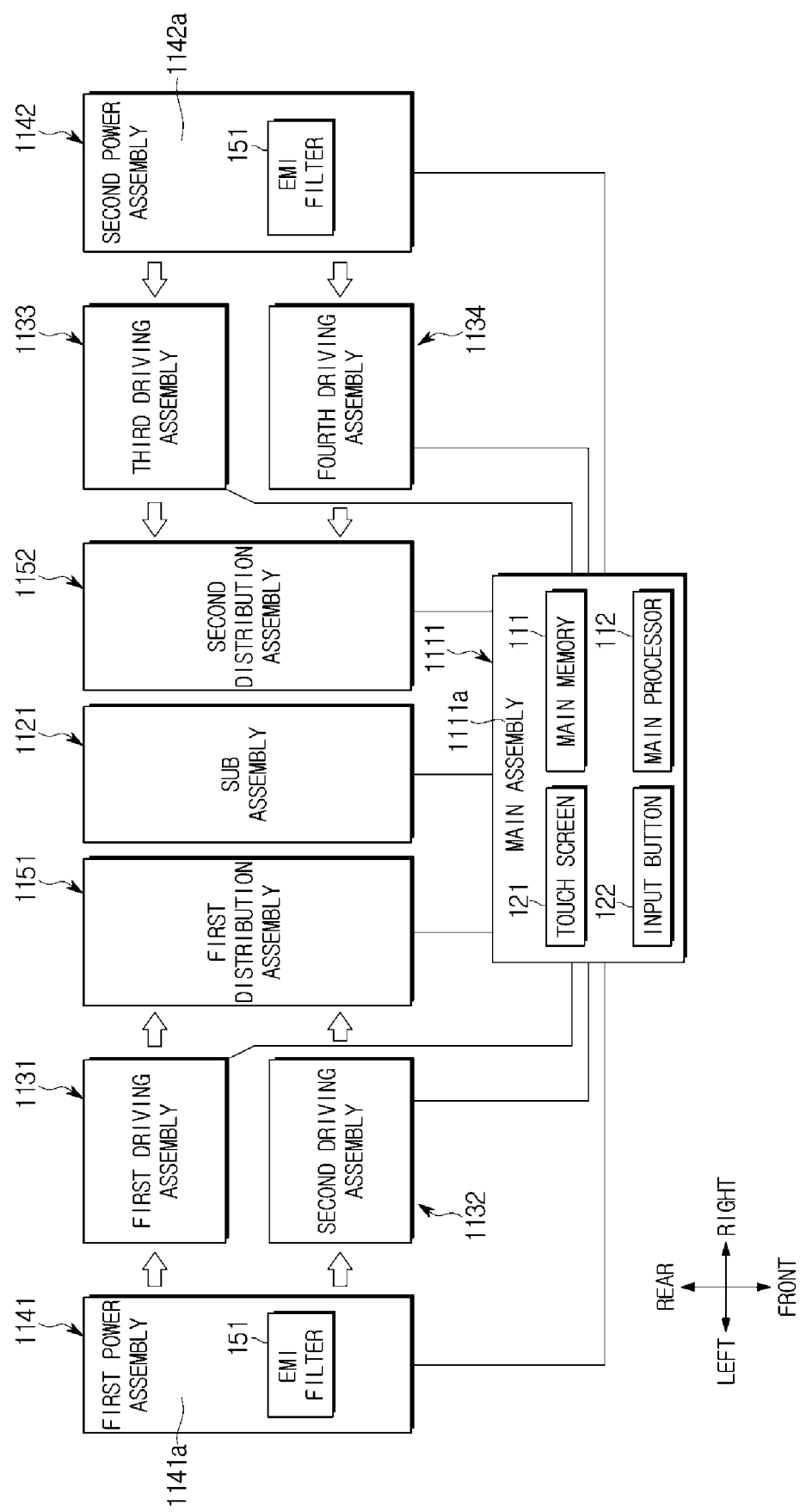
FIG. 14 illustrates another example of arrangement of PBAs included a cooking apparatus according to an embodiment.

For example, FIG. 14 illustrates another example of arrangement of PBAs included a cooking apparatus according to an embodiment. In addition, FIG. 15 illustrates an example of circuits included in driving assemblies and a sub assembly illustrated in FIG. 14.

Figure 15:
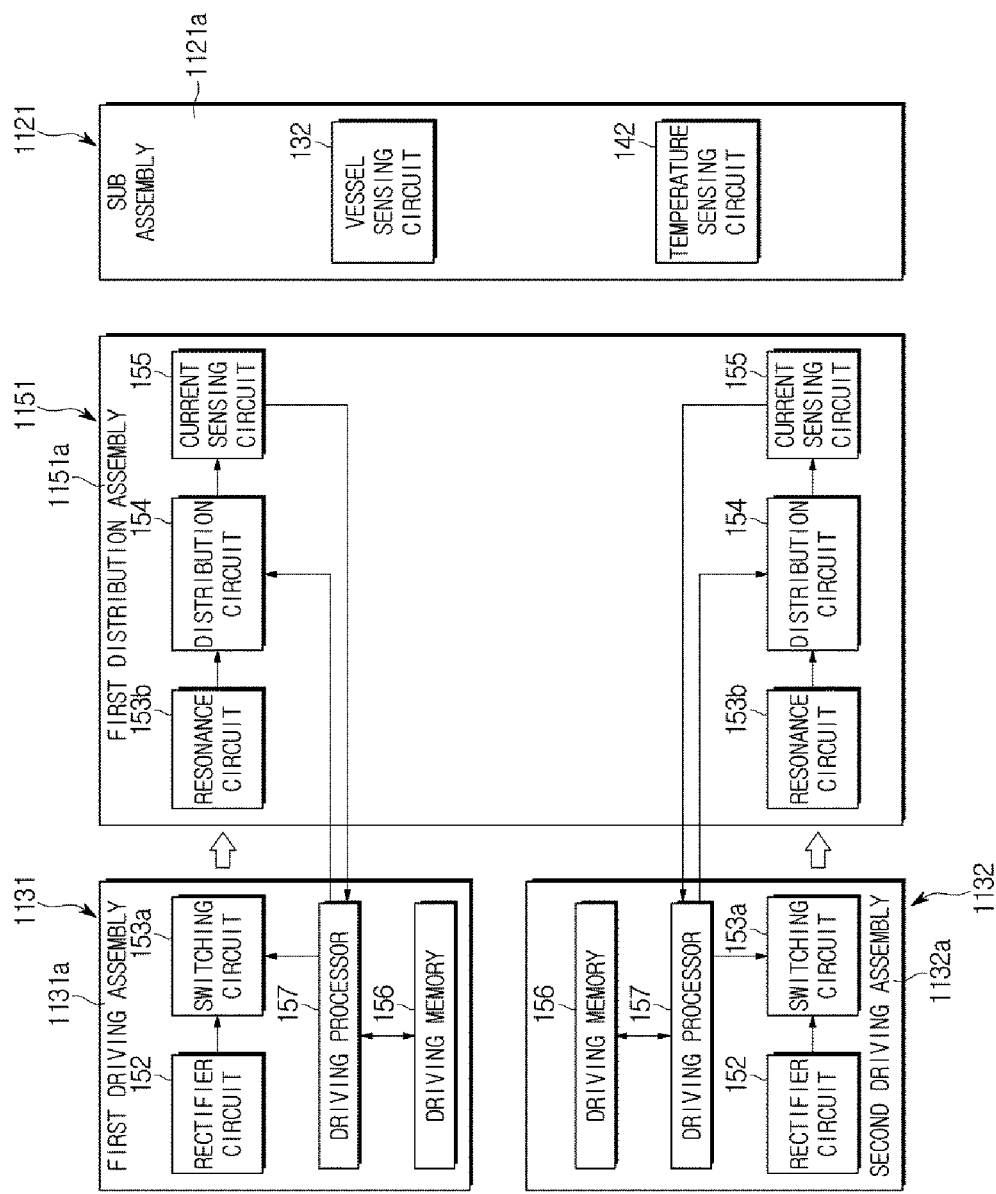
FIG. 15 illustrates an example of circuits included in driving assemblies and a sub assembly illustrated in FIG. 14.

As illustrated in FIGS. 14 and 15, the cooking apparatus 100 may include a main assembly 1111, a sub assembly 1121, a first driving assembly 1131, a second driving assembly 1132, a third driving assembly 1133, a fourth driving assembly 1134, a first distribution assembly 1151, a second distribution assembly 1152, a first power assembly 1141, and a second power assembly 1142.

The main assembly 1111 may be the same as the main assembly 1011 illustrated in FIG. 9.

The sub assembly 1121 may be the same as the sub assembly 1021 illustrated in FIG. 10.

The first driving assembly 1131 may include the rectifier circuit 152, the switching circuit 153a of the inverter circuit 153, the driving memory 156, and the driving processor 157 which may be mounted on a first driving PCB 1131a.

The inverter circuit 153 may include the switching circuit 153a and the resonance circuit 153b. A high-speed switching operation of the switching circuit 153a may interfere with the resonance circuit 153b. In order to prevent interference caused by the switching circuit 153a, the resonance circuit 153b may be separately installed in the distribution assemblies 1151 and 1152 which will be described later. In addition, the distribution circuit 154 and the current sensing circuit 155 in addition to the resonance circuit 153b may also be separately installed in the distribution assemblies 1151 and 1152. The EMI filters 151 may be separately installed in the first and second power assemblies 1141 and 1142 which will be described later.

In addition, the first driving assembly 1131 may include a connection terminal for connecting the driving processor 157 with the main processor 112 of the main assembly 1111, a connection terminal for connecting the rectifier circuit 152 with the EMI filter 151 of the first power assembly 1141, a connection terminal for connecting the switching circuit 153a with the resonance circuit 153b and the distribution circuit 154 of the first distribution assembly 1151, and a connection terminal for connecting the driving processor 157 with the distribution circuit 154 and the current sensing circuit 155 of the first distribution assembly 1151.

The second, third, and fourth driving assemblies 1132, 1133, and 1134 may have the same structure as that of the first driving assembly 1131. For example, the second driving assembly 1032 may include the rectifier circuit 152, the switching circuit 153a of the inverter circuit 153, the driving memory 156, and the driving processor 157 which may be mounted on a second driving PCB 1132a.

The first distribution assembly 1151 may include the resonance circuit 153b of the inverter circuit 153, the distribution circuit 154, and the current sensing circuit 155 which may be mounted on a first distribution PCB 1151a.

As described above, the resonance circuit 153b may be installed in distribution assemblies 1151 and 1152 to block interference from the switching circuit 153a. The current sensing circuit 155 may also be installed in the first and second distribution assemblies 1151 and 1152 to block interference from the switching circuit 153a. Since the distribution circuit 154 is disposed between the inverter circuit 153 and the current sensing circuit 155, the distribution circuit 154 may be installed in the distribution assemblies 1151 and 1152 to minimize wires between the driving assemblies 1131, 1132, 1133, and 1134 and the distribution assemblies 1151 and 1152.

The resonance circuit 153b connected to the switching circuit 153a of the first driving assembly 1131 may be separately disposed from the resonance circuit 153b connected to the switching circuit 153a of the second driving assembly 1132.

In addition, the distribution circuit 154 and the current sensing circuit 155 respectively connected to the switching circuit 153a of the first driving assembly 1131 may be separately disposed from the distribution circuit 154 and the current sensing circuit 155 respectively connected to the switching circuit 153a of the second driving assembly 1132. However, the present disclosure is not limited thereto, and the distribution circuits 154 of the first distribution assembly 1151 may be configured as a single circuit and the current sensing circuits 155 thereof may be configured as a single circuit.

In addition, the first distribution assembly 1151 may include a connection terminal for connecting the resonance circuit 153b and the distribution circuit 154 with the switching circuits 153a of the first and second driving assemblies 1131 and 1132 and a connection terminal for connecting the distribution circuit 154 and the current sensing circuit 155 with the driving processors 157 of the first and second driving assemblies 1131 and 1132.

The second distribution assembly 1152 may have the same structure as that of the first distribution assembly 1151. For example, the second distribution assembly 1152 may include the resonance circuit 153b of the inverter circuit 153, the distribution circuit 154, and the current sensing circuit 155. The distribution circuit 154 of the second distribution assembly 1152 may distribute driving currents supplied from the third driving assembly 1133 and the fourth driving assembly 1134 into the induction heating coils 201 belonging to the third group 230 and the induction heating coils 201 belonging to the fourth group 240. In addition, the current sensing circuit 155 or the second distribution assembly 1152 may measure current values supplied to the induction heating coils 201 belonging to the third group 230 and the induction heating coils 201 belonging to the fourth group 240.

The first power assembly 1141 may include the EMI filter 151 which may be mounted on a first power PCB 1141a.

In addition, the first power assembly 1141 may include a connection terminal for connecting the EMI filter 151 with the external power source and a connection terminal for connecting the EMI filter 151 with the rectifier circuits 152 of the first and second driving assemblies 1131 and 1132.

The structure of the second power assembly 1142 may be the same as that of the first power assembly 1141.

As described above, the components and circuits constituting the cooking apparatus 100 may be installed in the plurality of PBAs 1111, 1121, 1131, 1132, 1133, 1134, 1141, 1142, 1151, and 1152 according to functions, types of supplied power (AC power or DC power), operation frequencies, and the like.

In addition, the plurality of PBAs 1111, 1121, 1131, 1132, 1133, 1134, 1141, 1142, 1151, and 1152 may be arranged in various ways according to the components and circuits.

For example, the main assembly 1111 including the touch screen 121 and the input button 122 of the user interface 120 may be disposed inside the top surface 101a of the main body 101 or inside the front surface 101b of the main body 101 for interactions with the user.

The sub assembly 1121 including the vessel sensing circuit 132 and the temperature sensing circuit 142 respectively connected to the vessel sensors 131 and the temperature sensors 141 installed in the vicinity of the induction heating coils 201 may be disposed at the center the main body 101.

The first driving assembly 1131 may be mounted on the rear left side of the sub assembly 1121 and the second driving assembly 1132 may be mounted on the front left side of the sub assembly 1121. The third driving assembly 1133 may be mounted on the rear right side of the sub assembly 1121 and the fourth driving assembly 1134 may be mounted on the front right side of the sub assembly 1121.

The first distribution assembly 1151 may be disposed between the first and second driving assemblies 1131 and 1132 and the sub assembly 1121 to distribute driving currents of the first driving assembly 1131 to the induction heating coils 201 belonging to the first group 210 and to distribute driving currents of the second driving assembly 1132 to the induction heating coils 201 belonging to the second group 220.

The second distribution assembly 1152 may be disposed between the third and fourth driving assemblies 1133 and 1134 and the sub assembly 1121 to distribute driving currents of the third driving assembly 1133 to the induction heating coils 201 belonging to the third group 230 and to distribute driving currents of the fourth driving assembly 1134 to the induction heating coils 201 belonging to the fourth group 240.

The first power assembly 1141 may be disposed on the left side of the first and second driving assemblies 1131 and 1132, i.e., outside the first and second driving assemblies 1131 and 1132. Also, the second power assembly 1142 may be disposed on the right side of the third and fourth driving assemblies 1133 and 1134, i.e., outside the third and fourth driving assemblies 1133 and 1134.

By arranging the plurality of PBAs 1111, 1121, 1131, 1132, 1133, 1134, 1141, 1142, 1151, and 1152 as illustrated in FIG. 14, the lengths and numbers of wires used to connect the PBAs may be minimized and intersections of the wires may also be minimized.

However, the circuits installed in the driving assemblies 1131, 1132, 1133, and 1134, the distribution assemblies 1151 and 1152, and the sub assembly 1121 are not limited to those illustrated in FIG. 15.

Figure 16:
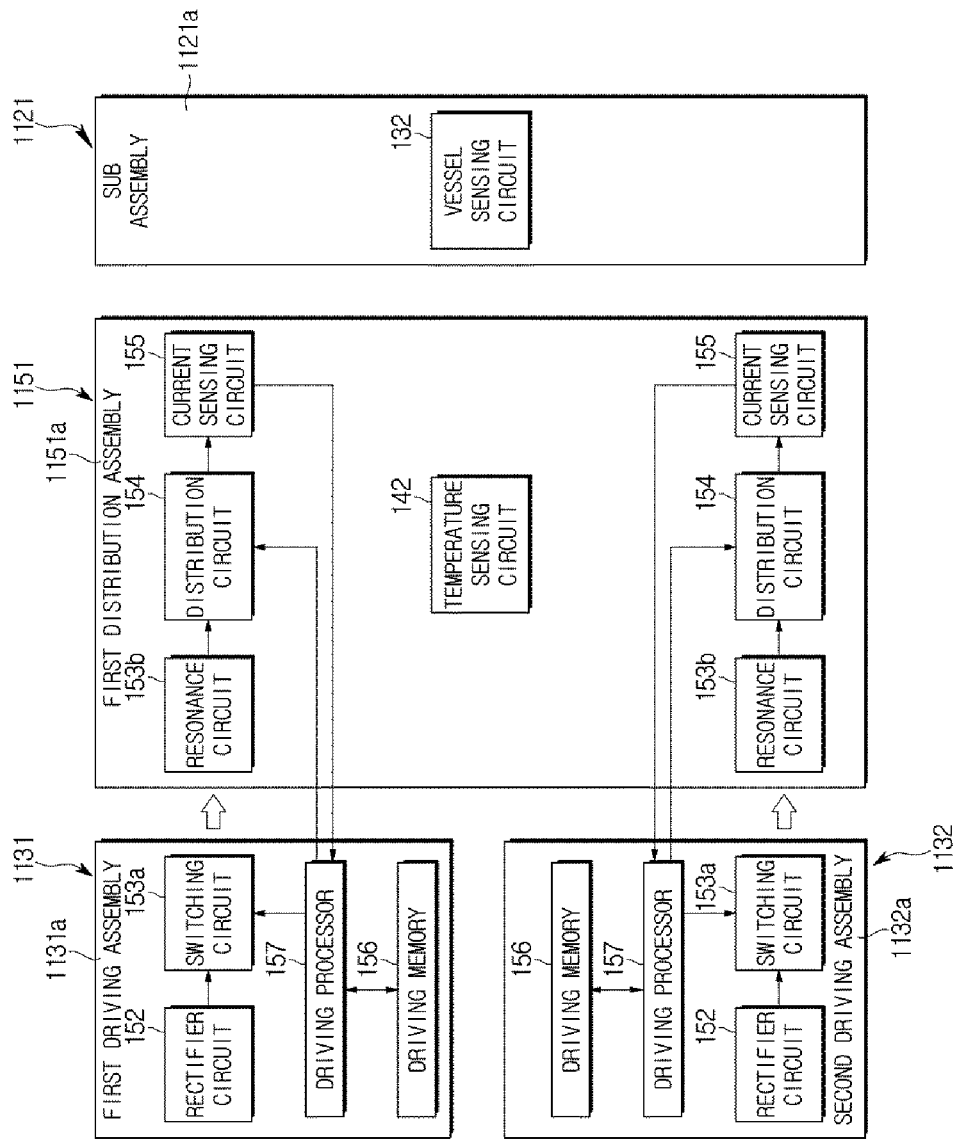
FIG. 16 illustrates another example of circuits included in the driving assemblies and the sub assembly illustrated in FIG. 14.

For example, FIG. 16 illustrates another example of circuits included in the driving assemblies and the sub assembly illustrated in FIG. 14.

The sub assembly 1121 may be the same as the memory sub assembly 1021 illustrated in FIG. 12.

The driving assemblies 1131, 1132, 1133, and 1134 may be the same as the driving assemblies 1131, 1132, 1133, and 1134 illustrated in FIG. 15.

As illustrated in FIG. 16, the first distribution assembly 1151 may include the resonance circuit 153b of the inverter circuit 153, the distribution circuit 154, the current sensing circuit 155, and the temperature sensing circuit 141 which may be mounted on the first distribution PCB 1151a.

The driving and distribution circuits 153b, 154, and 155 included in the first distribution assembly 1151 may distribute driving currents to the induction heating coils 201 belonging to the first and second groups 210 and 220.

The plurality of temperature sensors 141 may be separately disposed from the temperature sensing circuit 142 and installed in the vicinity of the induction heating coils 201. The temperature sensing circuit 142 included in the first distribution assembly 1151 may be connected to the temperature sensors 141 installed in the vicinity of the induction heating coils 201 belonging to the first and second groups 210 and 220 and receive temperatures of the cooking vessel from the temperature sensors 141.

In addition, the first distribution assembly 1151 may include a connection terminal for connecting the resonance circuit 153b and the distribution circuit 154 with the switching circuits 153a of the first and second driving assemblies 1131 and 1132, a connection terminal for connecting the distribution circuit 154 and the current sensing circuit 155 with the driving processors 157 of the first and second driving assemblies 1131 and 1132, a connection terminal for connecting the temperature sensing circuit 142 with the temperature sensors 141, and a connection terminal for connecting the temperature sensing circuit 142 with the main processor 112 of the main assembly 1111.

The structure of the second distribution assembly 1152 may be the same as that of the first distribution assembly 1151. Particularly, the temperature sensing circuit 142 included in the second distribution assembly 1152 may receive temperatures of the cooking vessel from the temperature sensors 141 installed in the vicinity of the induction heating coils 201 belonging to the third and fourth groups 230 and 240.

Figure 17:
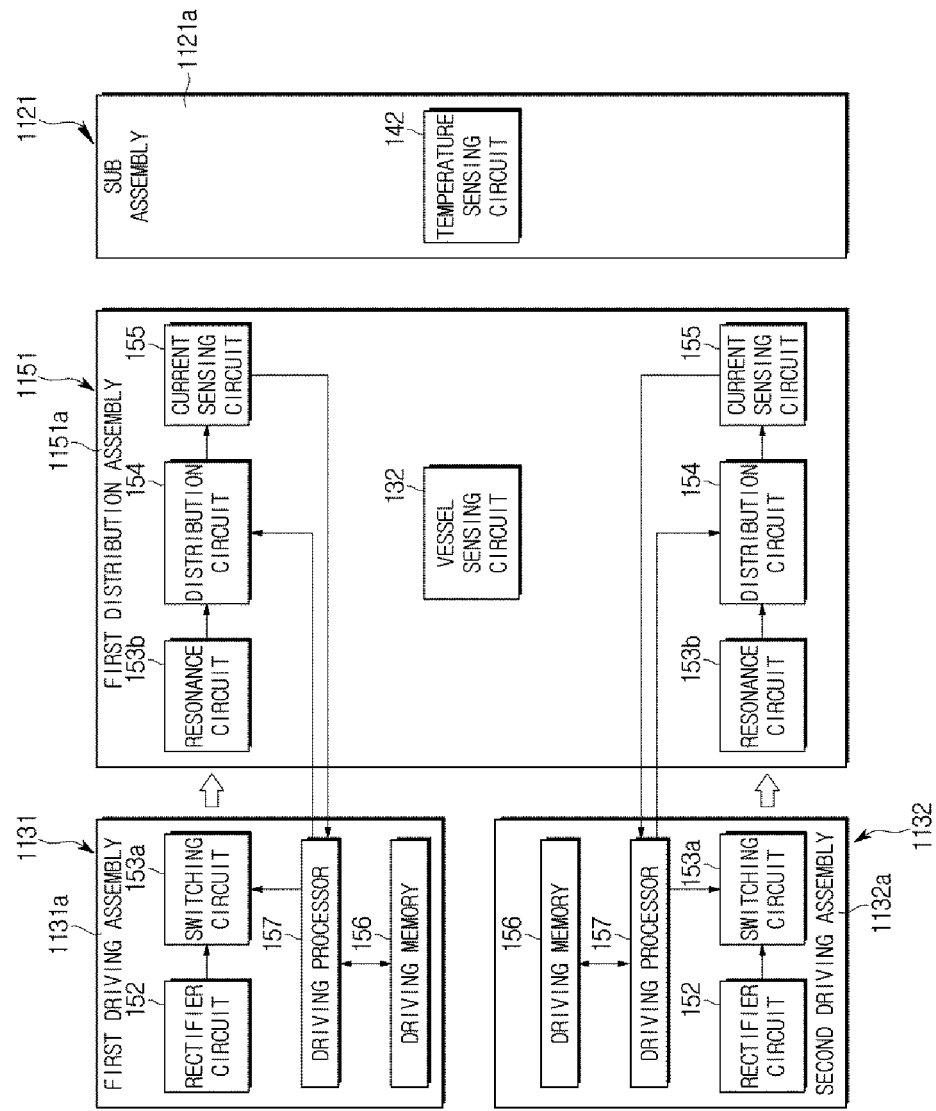
FIG. 17 illustrates another example of circuits included in the driving assemblies and the sub assembly illustrated in FIG. 14.

For example, FIG. 17 illustrates another example of circuits included in the driving assemblies and the sub assembly illustrated in FIG. 14.

The sub assembly 1121 may be the same as the sub assembly 1021 illustrated in FIG. 13.

The driving assemblies 1131, 1132, 1133, and 1134 may be the same as the driving assemblies 1131, 1132, 1133, 1134 illustrated in FIG. 15.

As illustrated in FIG. 17, the first distribution assembly 1151 may include the resonance circuit 153b of the inverter circuit 153, the distribution circuit 154, and the vessel sensing circuit 132 which may be mounted on the first distribution PCB 1151a.

The driving and distribution circuits 153b, 154, and 155 included in the first distribution assembly 1151 may distribute driving currents to the induction heating coils 201 belonging to the first and second groups 210 and 220.

The plurality of vessel sensors 131 may be separately disposed from the vessel sensing circuit 132 and installed in the vicinity of the induction heating coils 201. The vessel sensing circuit 132 included in the first distribution assembly 1151 may be connected to the vessel sensors 131 installed in the vicinity of the induction heating coils 201 belonging to the first and second groups 210 and 220 and receive detection results of the cooking vessel from the vessel sensors 131.

In addition, the first distribution assembly 1151 may include a connection terminal for connecting the resonance circuit 153b and the distribution circuit 154 with the switching circuits 153a of the first and second driving assemblies 1131 and 1132, a connection terminal for connecting the distribution circuit 154 and the current sensing circuit 155 with the driving processors 157 of the first and second driving assemblies 1131 and 1132, a connection terminal for connecting the vessel sensing circuit 132 with the vessel sensors 131, and a connection terminal for connecting the vessel sensing circuit 132 with the main processor 112 of the main assembly 1111.

The structure of the second distribution assembly 1152 may be the same as that of the first distribution assembly 1151. Particularly, the vessel sensing circuit 132 included in the second distribution assembly 1152 may receive detection results of the cooking vessel from the vessel sensors 131 installed in the vicinity of the induction heating coils 201 belonging to the third and fourth groups 230 and 240.

The configurations and arrangements of the plurality of PBAs included in the cooking apparatus 100 are not limited to those illustrated in FIGS. 14, 15, 16 and 17.

Figure 18:
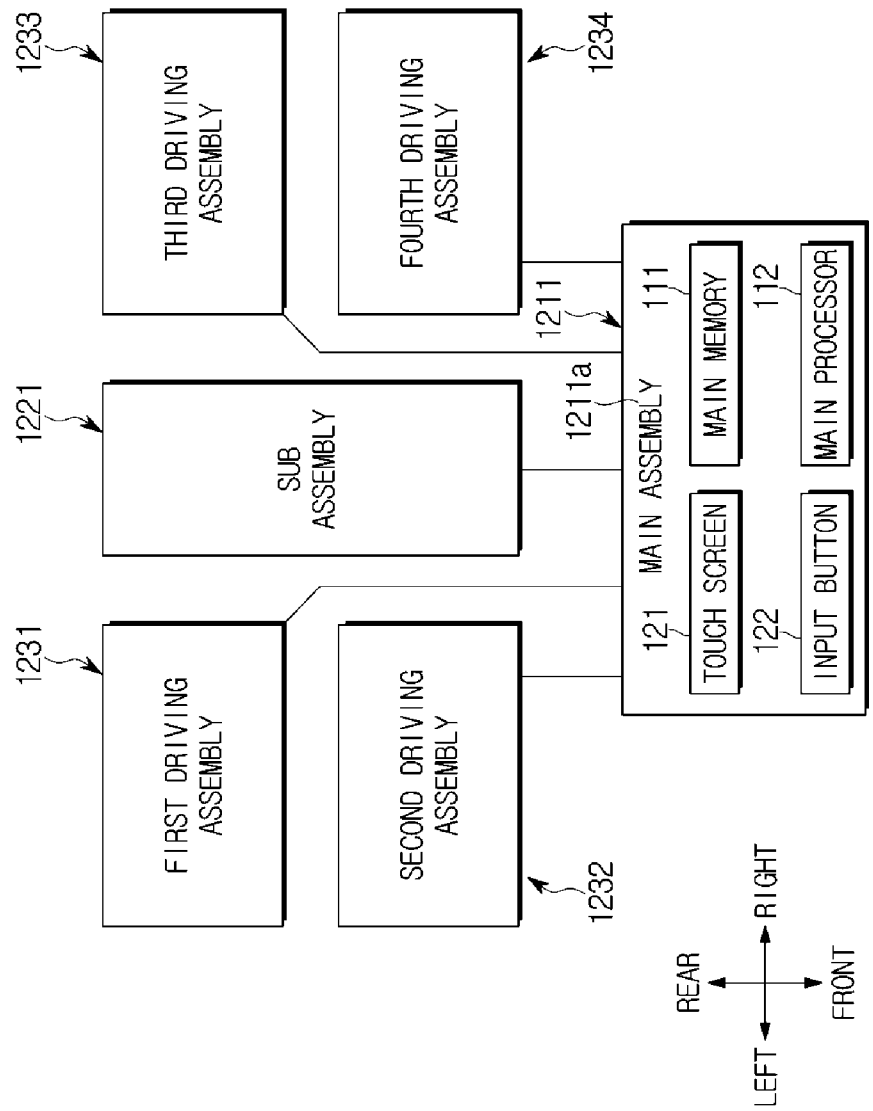
FIG. 18 illustrates another example of arrangement of PBAs included in a cooking apparatus according to an embodiment.
Figure 19:
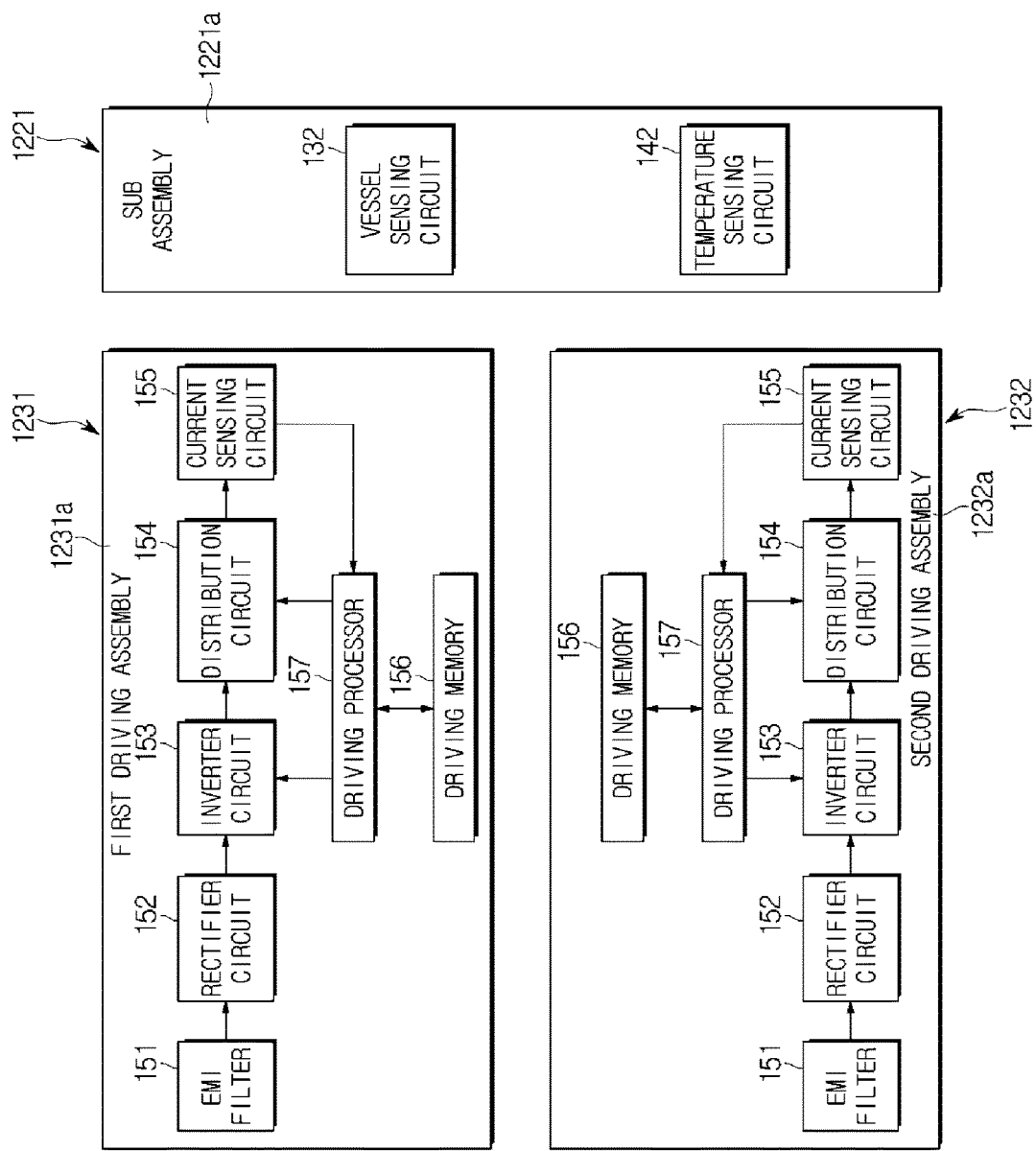
FIG. 19 illustrates an example of circuits included in driving assemblies and a sub assembly illustrated in FIG. 18.

For example, FIG. 18 illustrates another example of arrangement of PBAs included in a cooking apparatus according to an embodiment. FIG. 19 illustrates an example of circuits included in driving assemblies and a sub assembly illustrated in FIG. 18.

Referring to FIGS. 18 and 19, the cooking apparatus 100 may include a main assembly 1211, a sub assembly 1221, a first driving assembly 1231, a second driving assembly 1232, a third driving assembly 1233, and a fourth driving assembly 1234.

The main assembly 1211 may be the same as the main assembly 1011 illustrated in FIG. 9.

The sub assembly 1221 may be the same as the sub assembly 1021 illustrated in FIG. 10.

The first driving assembly 1231 may include the EMI filter 151, the rectifier circuit 152, the inverter circuit 153, the distribution circuit 154, the current sensing circuit 155, the driving memory 156, and the driving processor 157 which may be mounted on a first driving PCB 1231a. As described above, the EMI filter 151 may be installed in the first driving assembly 1231 together with the rectifier circuit 152, the inverter circuit 153, the distribution circuit 154, the current sensing circuit 155, and the driving memory 156.

In addition, the first driving assembly 1231 may include a connection terminal for connecting the driving processor 157 with the main processor 112 of the main assembly 1011 and a connection terminal for connecting the distribution circuit 154 with the plurality of induction heating coils 201 belonging to the first group 210.

The second driving assembly 1232, the third driving assembly 1233, and the fourth driving assembly 1234 may have the same structure as that of the first driving assembly 1231. For example, the second driving assembly 1232 may include the EMI filter 151, the rectifier circuit 152, the inverter circuit 153, the distribution circuit 154, the current sensing circuit 155, the driving memory 156, and the driving processor 157 which may be mounted on a second driving PCB 1232a.

As described above, the components and circuits constituting the cooking apparatus 100 may be installed in the plurality of PBAs 1211, 1221, 1231, 1232, 1233, and 1234 according to functions, types of supplied power (AC power or DC power), operation frequencies, and the like.

In addition, the plurality of PBAs 1211, 1221, 1231, 1232, 1233, and 1234 may be arranged in various ways according to the components and circuits.

For example, the main assembly 1211 may be disposed inside the top surface 101a of the main body 101 or inside the front surface 101b of the main body 101 for interactions with the user. The sub assembly 1221 may be installed at the center inside the main body 101.

The first driving assembly 1231 may be mounted on the rear left side of the sub assembly 1221 and the second driving assembly 1232 may be mounted on the front left side of the sub assembly 1221. The third driving assembly 1233 may be mounted on the rear right side of the sub assembly 1221 and the fourth driving assembly 1234 may be mounted on the front right side of the sub assembly 1221.

The circuits installed in the driving assemblies 1231, 1232, 1233, and 1234 and the sub assembly 1221 are not limited to those illustrated in FIG. 19.

Figure 20:
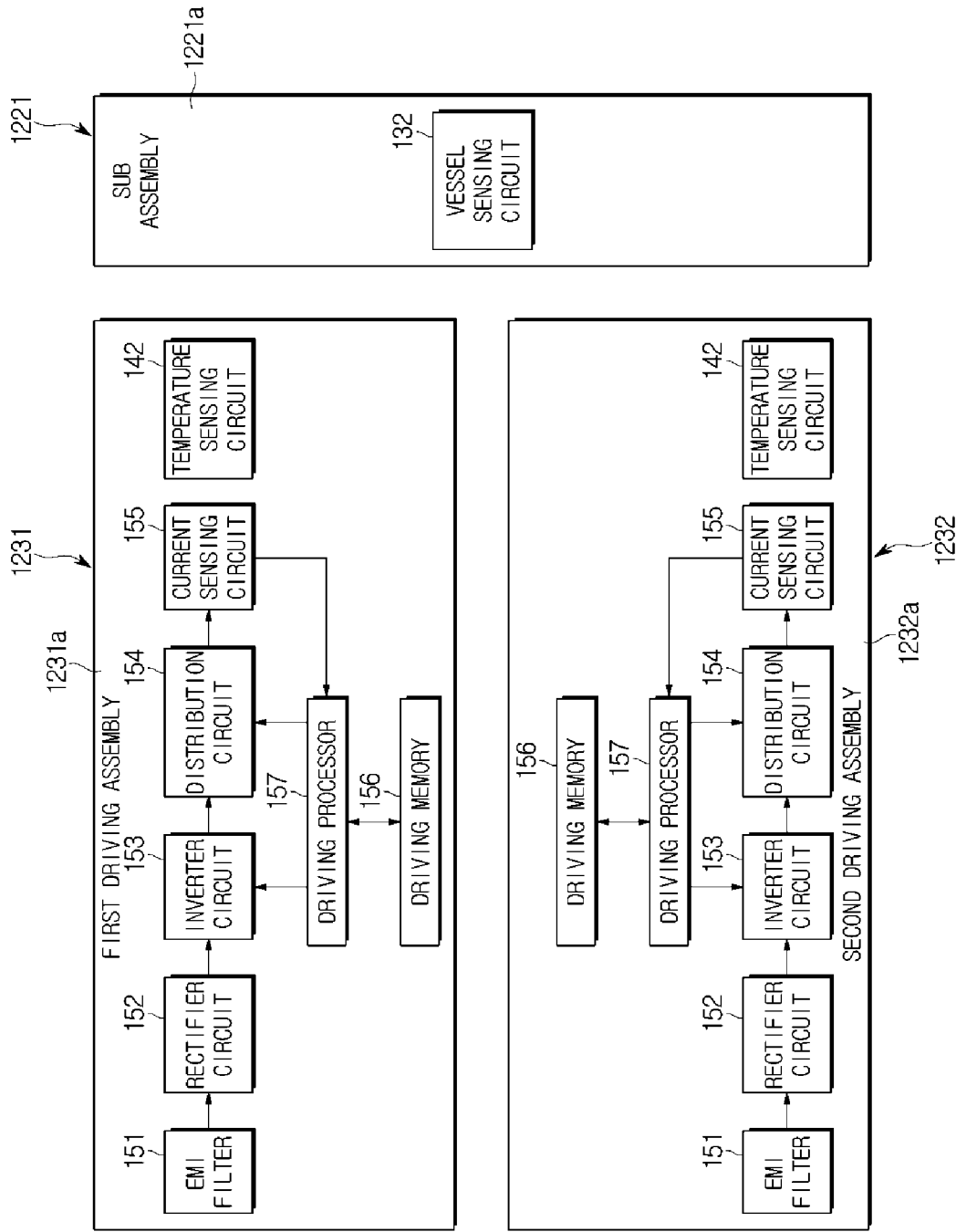
FIG. 20 illustrates another example of circuits included in the driving assemblies and the sub assembly illustrated in FIG. 18.

For example, FIG. 20 illustrates another example of circuits included in the driving assemblies and the sub assembly illustrated in FIG. 18.

The sub assembly 1221 may be the same as the sub assembly 1021 illustrated in FIG. 12.

The first driving assembly 1231 may include the EMI filter 151, the rectifier circuit 152, the inverter circuit 153, the distribution circuit 154, the current sensing circuit 155, the driving memory 156, the driving processor 157, and the temperature sensing circuit 142 which may be mounted on the first driving PCB 1231a.

In addition, the first driving assembly 1231 may include a connection terminal for connecting the driving processor 157 with the main processor 112 of the main assembly 1011, a connection terminal for connecting the distribution circuit 154 with the plurality of induction heating coils 201 belonging to the first group 210, a connection terminal for connecting the temperature sensing circuit 142 with the temperature sensors 141 installed in the vicinity of the plurality of induction heating coils 201, and a connection terminal for connecting the temperature sensing circuit 142 with the main processor 112 of the main assembly 1211.

The second, third, and fourth driving assemblies 1232, 1233, and 1234 may have the same structure as that of the first driving assembly 1231.

Figure 21:
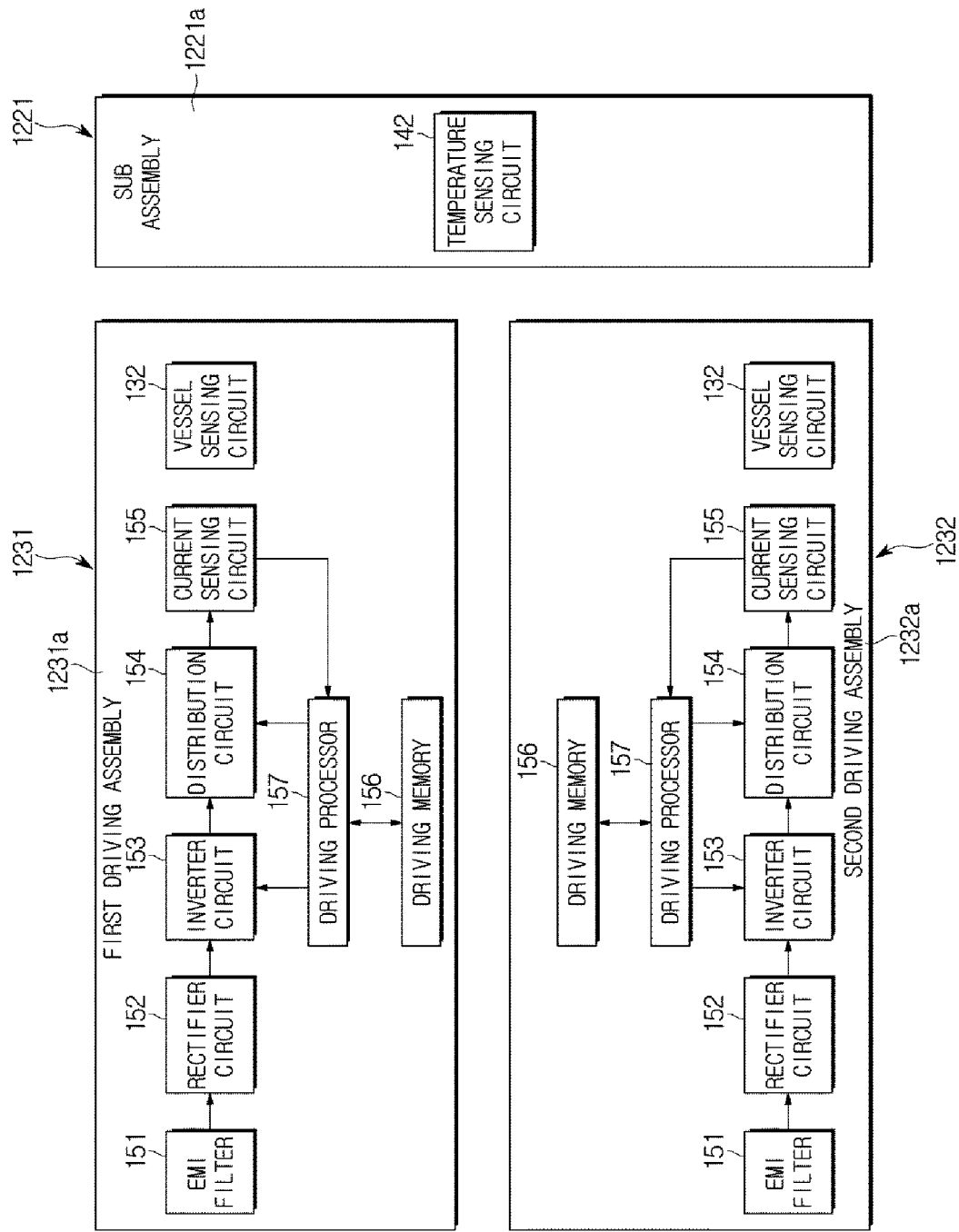
FIG. 21 illustrates another example of circuits included in the driving assemblies and the sub assembly shown in FIG. 18.

For example, FIG. 21 illustrates another example of circuits included in the driving assemblies and the sub assembly shown in FIG. 18.

The sub assembly 1221 may be the same as the sub assembly 1021 illustrated in FIG. 13.

The first driving assembly 1231 may include the EMI filter 151, the rectifier circuit 152, the inverter circuit 153, the distribution circuit 154, the current sensing circuit 155, the driving memory 156, the driving processor 157, and the vessel sensing circuit 132 which may be mounted on the first driving PCB 1231a.

In addition, the first driving assembly 1231 may include a connection terminal for connecting the driving processor 157 with the main processor 112 of the main assembly 1011, a connection terminal for connecting the distribution circuit 154 with the plurality of induction heating coils 201 belonging to the first group 210, a connection terminal for connecting the vessel sensing circuit 132 with the vessel sensors 131 installed in the vicinity of the plurality of induction heating coils 201, and a connection terminal for connecting the vessel sensing circuit 132 with the main processor 112 of the main assembly 1211.

The second, third, and fourth driving assemblies 1232, 1233, and 1234 may have the same structure as that of the first driving assembly 1231.

As is apparent from the above description, the cooking apparatus in which PBAs including driving circuits and control circuits are easily assembled is provided.

According to the present disclosure, the cooking apparatus in which driving circuits and control circuits are installed in a plurality of PBAs is provided.

According to the present disclosure, the cooking apparatus in which the plurality of PBAs are arranged to minimize wires connecting the PBAs is provided.

Although a few embodiments of the present disclosure have been shown and described, it would be appreciated by those skilled in the art that changes may be made in these embodiments without departing from the principles and spirit of the disclosure, the scope of which is defined in the claims and their equivalents.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A cooking apparatus comprising:
a cooking plate;
an induction heating coil installed under the cooking plate;
another induction coil installed under the cooking plate;
a driving assembly including
a driving printed circuit board (PCB) and
a driving circuit disposed on the driving PCB to generate a driving current and distribute the driving current to the induction heating coil;
another driving assembly including
another driving PCB, which is manufactured separately from the driving PCB, and
another driving circuit disposed on the other driving PCB to generate another driving current and distribute the other driving current to the other induction heating coil; and
a sub assembly including
a sub PCB, which is manufactured separately from the driving PCB and the other driving PCB, and
an object sensing circuit disposed on the sub PCB to identify whether the induction heating coil overlaps with an object on the cooking plate, wherein the sub assembly is disposed between the driving assembly and the other driving assembly.

2. The cooking apparatus according to claim 1, further comprising:
an object sensor installed under the cooking plate; and
wherein the object sensing circuit identifies whether the induction heating coil overlaps with the object based on an output of the object sensor.

3. The cooking apparatus according to claim 1, wherein the driving assembly includes a power circuit disposed on the driving PCB to supply power to the driving circuit from an external power source, and
the other driving assembly includes another power circuit disposed on the other driving PCB to supply power to the other driving circuit from the external power source.

4. The cooking apparatus according to claim 1, further comprising:
a power assembly including a power PCB and a power circuit disposed on the power PCB to supply power to the driving circuit from an external power source, and
another power assembly including another power PCB and another power circuit disposed on the other power PCB to supply power to the other driving circuit from the external power source.

5. The cooking apparatus according to claim 4, wherein the sub assembly, the driving assembly, and the other driving assembly are disposed between the power assembly and the other power assembly.

6. The cooking apparatus according to claim 2, further comprising:
a main assembly including a main PCB and a main processor disposed on the main PCB to control the driving circuit to supply the driving current to the induction heating coil overlapping the object based on an output of the object sensing circuit.

7. The cooking apparatus according to claim 2, further comprising:
a temperature sensor installed under the cooking plate, and
a temperature sensing circuit configured to identify a temperature of the object placed on the cooking plate based on an output of the temperature sensor.

8. The cooking apparatus according to claim 7, wherein the temperature sensing circuit is disposed on the sub PCB.

9. The cooking apparatus according to claim 7, wherein the temperature sensing circuit is disposed on at least one of the driving PCB and the other driving PCB.

10. The cooking apparatus according to claim 7, wherein the temperature sensor and the object sensor are disposed in a vicinity of each of the induction heating coil and the other induction heating coil.

11. The cooking apparatus according to claim 1, wherein the driving circuit comprises:
- an inverter circuit comprising an inverter switch configured to generate the driving current and a resonance capacitor configured to resonate with the induction heating coil,
- a driving processor configured to control the inverter switch, and
- a distribution circuit comprising a distribution switch configured to distribute the driving current generated by the inverter circuit to the induction heating coil.

12. The cooking apparatus according to claim 11, wherein the driving processor opens or closes the distribution switch to supply the driving current to the induction heating coil overlapping an object.

13. The cooking apparatus according to claim 11, wherein the driving circuit further comprises a current sensing circuit configured to measure the driving current.

14. The cooking apparatus according to claim 12, wherein the driving processor determines an opening/closing cycle of the inverter switch based on an output of a current sensing circuit and opens or closes the inverter switch in accordance with the opening/closing cycle of the inverter switch.

15. A cooking apparatus comprising:
- a cooking plate;
- an induction heating coil installed under the cooking plate;
- another induction heating coil installed under the cooking plate;
- a driving assembly including
  - a driving printed circuit board (PCB) and
  - an inverter circuit disposed on the driving PCB to generate a driving current supplied to the induction heating coil;
- another driving assembly including
  - another driving PCB, which is manufactured separately from the driving PCB, and
  - another inverter circuit disposed on the other driving PCB to generate another driving current supplied to the other induction heating coil;
- a distribution assembly including
  - a distribution PCB, which is manufactured separately form the driving PCB and the other driving PCB,
  - a resonance capacitor disposed on the distribution PCB to resonate with the induction heating coil and
  - a distribution circuit disposed on the distribution PCB to distribute the driving current to the induction heating coil;
- another distribution assembly including
  - another distribution PCB, which is manufactured separately from the driving PCB, the other driving PCB, and the distribution PCB,
  - another resonance capacitor disposed on the other distribution PCB to resonate with the other induction heating coils, and
  - another distribution circuit disposed on the other distribution PCB to distribute the other driving current to the other induction heating cool; and
- a sub assembly including
  - a sub PCB, which is manufactured separately from the driving PCB, the driving PCB, the other driving PCB and the distribution PCB and the other distribution PCB, and
  - a sensing circuit disposed on the sub PCB to identify whether the induction heating coil overlaps an object on the cooking plate, and
- wherein the sub assembly is disposed between the distribution assembly and the other distribution assembly, and
- the sub assembly, the distribution assembly, and the other distribution assembly are disposed between the driving assembly and the other driving assembly.

16. The cooking apparatus according to claim 15, further comprising:
- an object sensor installed under the cooking plate; and
- wherein the object sensing circuit identifies whether the induction heating coil overlaps with the object based on an output of the object sensor.

17. The cooking apparatus according to claim 16, further comprising:
- a power assembly including a power PCB and a power circuit disposed on the power PCB to supply power to the driving circuit from an external power source, and
- another power assembly including another power PCB and another power circuit disposed on the other power PCB to supply power to another driving circuit from the external power source,
- wherein the sub assembly, the distribution assembly, the other distribution assembly, the driving assembly, and the other driving assembly are disposed between the power assembly and the other power assembly.

* * * * *